United States Patent [19]
Yamamoto et al.

[11] Patent Number: 5,667,148
[45] Date of Patent: Sep. 16, 1997

[54] APPARATUS AND METHOD FOR PEELING AND REMOVING A COATED FILMS ON RESIN PRODUCT

[75] Inventors: Hiroshi Yamamoto, Oota; Kenichi Arai, Kumagaya, both of Japan

[73] Assignee: Fuji Jukogyo Kabushiki Kaisha, Tokyo, Japan

[21] Appl. No.: 629,219

[22] Filed: Apr. 8, 1996

[30] Foreign Application Priority Data

Apr. 12, 1995 [JP] Japan .................. 7-087208

[51] Int. Cl.⁶ .................................. B02C 19/12
[52] U.S. Cl. .............. 241/3; 241/24.28; 241/29; 241/157
[58] Field of Search ............. 241/3, 24.28, 152.2, 241/157, DIG. 38, 29

[56] References Cited

U.S. PATENT DOCUMENTS

| | | | |
|---|---|---|---|
| 4,840,316 | 6/1989 | Barclay | 241/279 |
| 4,940,187 | 7/1990 | Lee | 241/79.1 |
| 5,279,465 | 1/1994 | Stroppiana | 241/29 |
| 5,323,971 | 6/1994 | Nishibori et al. | 241/3 |
| 5,556,040 | 9/1996 | Irie et al. | 241/24.29 |
| 5,566,888 | 10/1996 | Yamamoto | 241/3 |
| 5,566,889 | 10/1996 | Preiss | 241/19 |
| 5,588,599 | 12/1996 | Novak | 241/23 |

FOREIGN PATENT DOCUMENTS

| | | | |
|---|---|---|---|
| 6106536 | 4/1994 | Japan | 241/24.28 |
| 2267048 | 11/1993 | United Kingdom | 241/24.28 |

*Primary Examiner*—John M. Husar
*Attorney, Agent, or Firm*—Beveridge, DeGrandi, Weilacher & Young, L.L.P.

[57] ABSTRACT

A coated film peeling/removing apparatus for a coated resin product includes a protruded portion shearing device for shearing and removing a protruded portion of the coated resin product, an end part treating device for rolling a coated resin product so as to modify the sectional contour such that the coated film side becomes a short side relative to the resin raw material side, and upper and lower surface coated film peeling devices for peeling and removing the coated film from the resin product by applying a shear slipping stress between the resin product and the coated film.

9 Claims, 22 Drawing Sheets

FIG. I

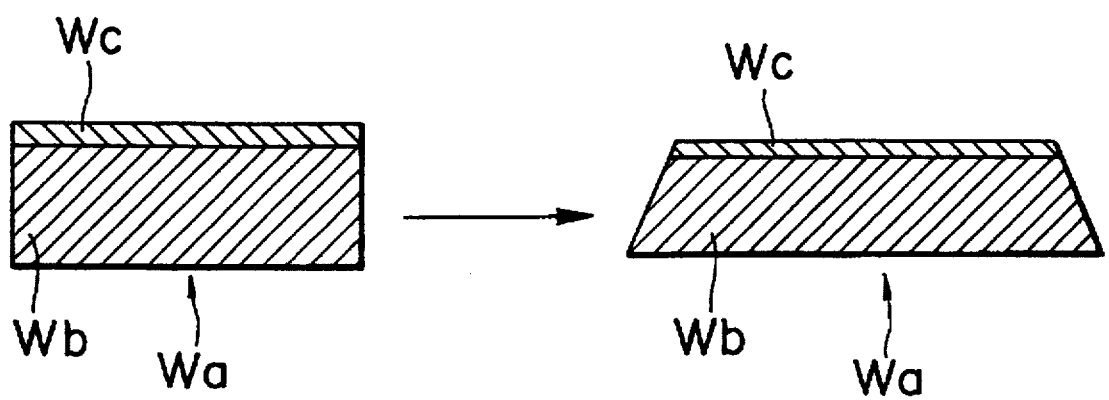
F I G. 11

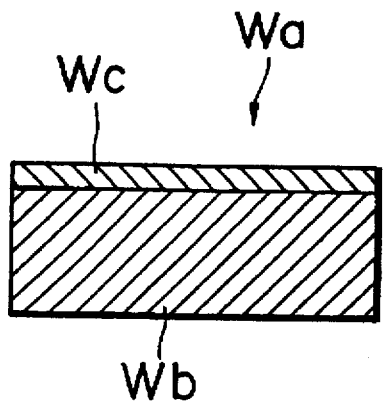
F I G. 13a
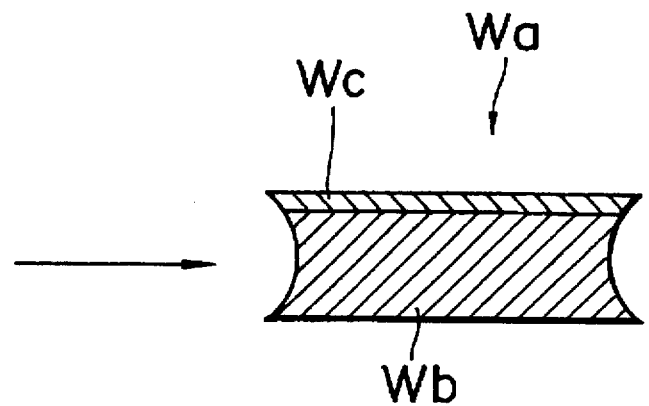
F I G. 13b
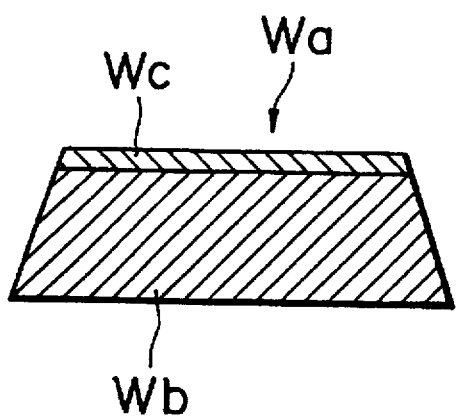
F I G. 13c
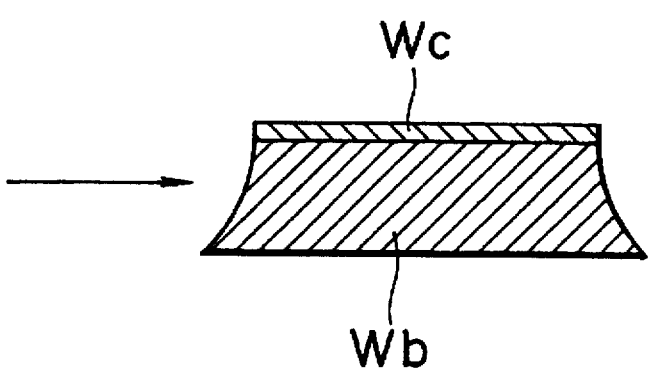
F I G. 13d

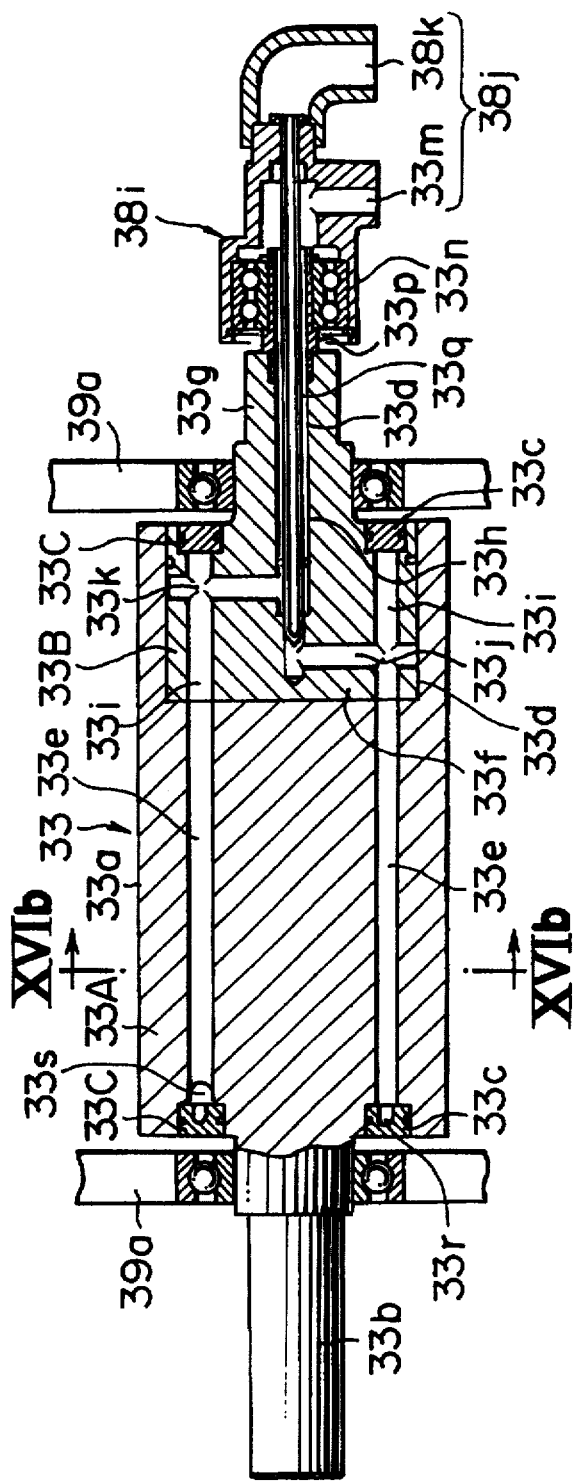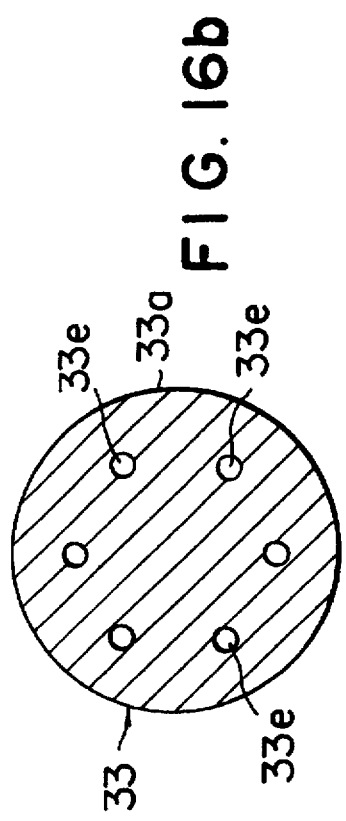
FIG.16a
FIG.16b

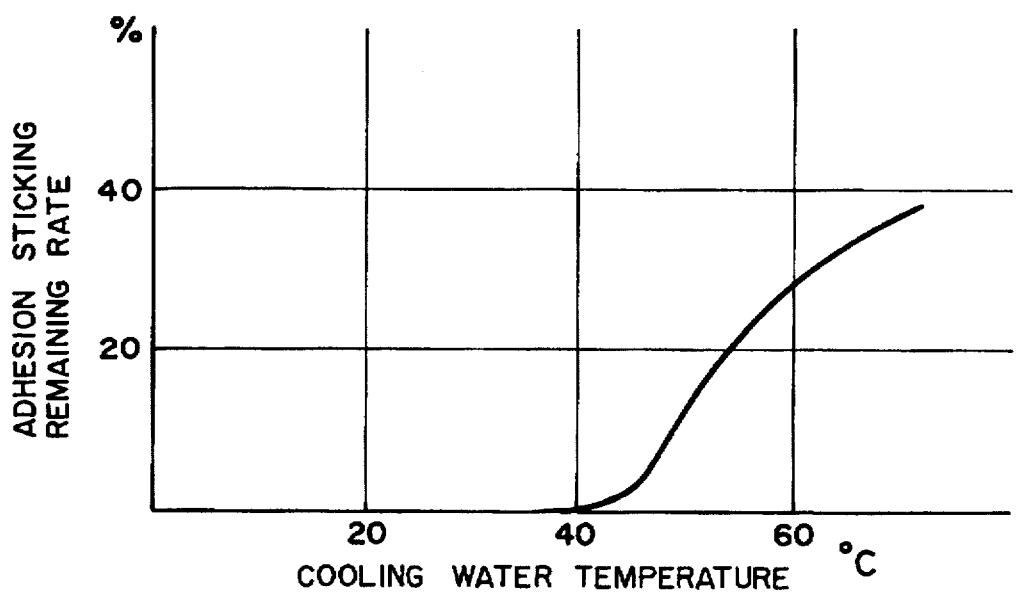
F I G. 18a
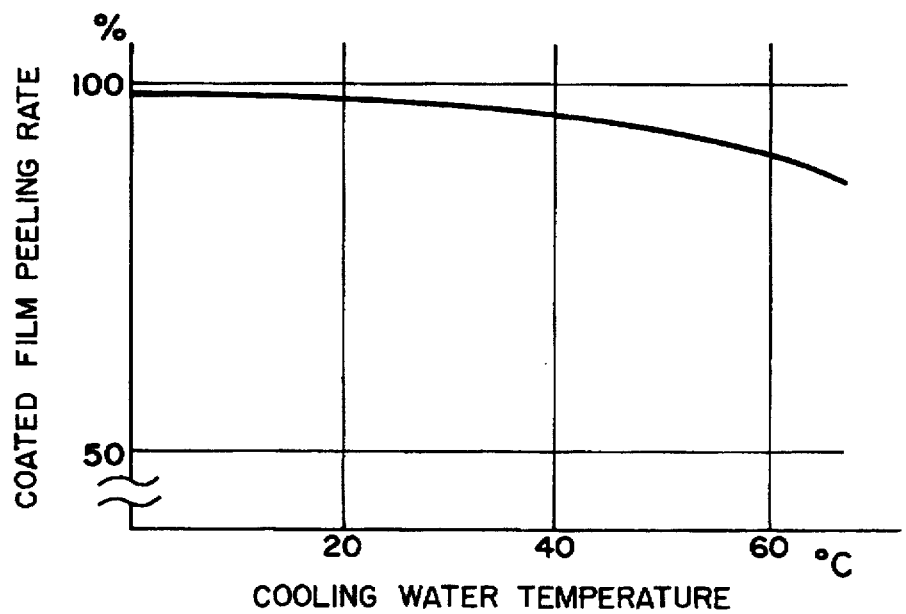
F I G. 18b

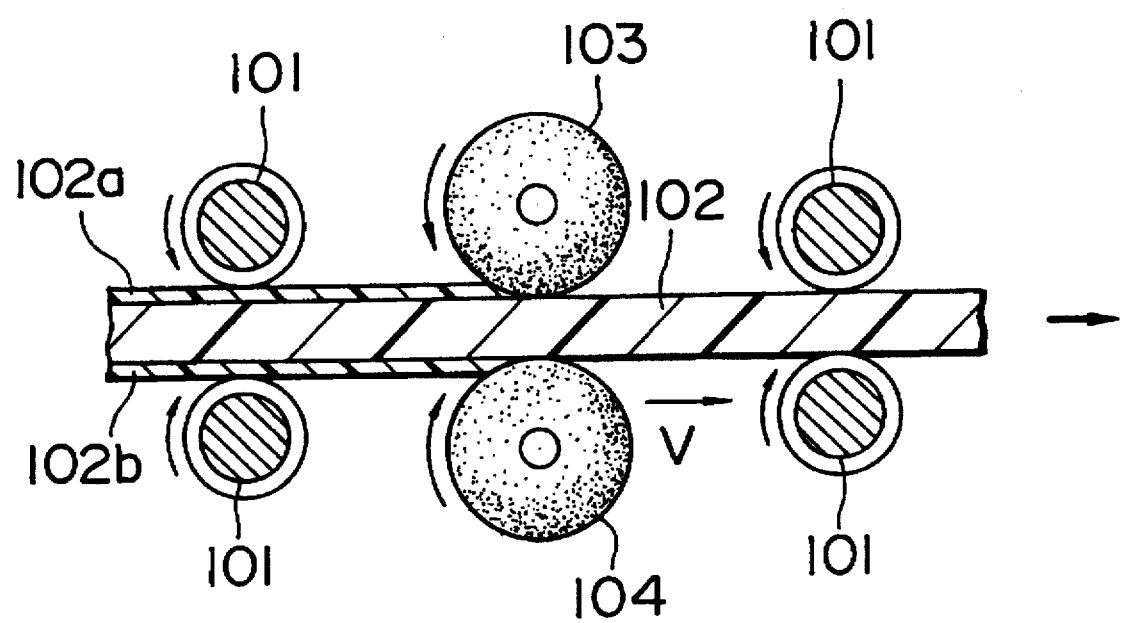
F I G. 22

ABSTRACT# APPARATUS AND METHOD FOR PEELING AND REMOVING A COATED FILMS ON RESIN PRODUCT

BACKGROUND OF THE INVENTION

1) Field of the Invention

The present invention relates to a coated film peeling/removing apparatus for coated resin products, bumpers, side lacings for a vehicle, CD-ROM or the like used electronic appliances. Further, the present invention relates to a peeling/removing method of the coated film.

2) Description of the Prior Art

In recent years, serious consideration has been given to recycling of resin product due to mounting interest in environmental problems and reutilization of sources (materials, natural resourses). Attention has been given to recycling of resin products removed from discarded vehicles and discarded products. The problems are particularly intense for used products such as bumpers, side lacings or similar resin products produced by the vehicle industry.

The surface of this kind of resin products such as bumpers, side lacings or the like is usually coated with surface treatment materials for improving appearance and quality. In general, a film is coated on the surface of the bumpers made from thermoplastic resin materials such as polypropylene based resin or the like after applying a primer composed of thermoplastic resin such as polypropylene based resin or the like. The material of this coated film is a thermosetting resin, e.g., an amino polyester based resin, an amino acrylic based resin, an amino polyester urethane based resin or an acrylic urethane based resin. These resins are liquid before the hardening reaction but a bridge structure is formed in the film by a baking finish. Since the structure is strong and dense, the coated resin bumper has excellent chemical resistance, heat resistance, scratching resistance, weather resistance and excellent surface brightness.

When the coated bumper is crushed in this condition for pelletizing, coated film pieces are mixed in the raw material of the resin product composed of polypropylene based resin. When molded into polypropylene based resin, the coated film pieces obstruct flowability of the molten resin, causing "burn", "weld mark", "bubbles" or a similar flowed moldings to occur. Another drawback is that the coated film pieces float up to the surface of the resin product which degrades the appearance of the resin product.

The coated film pieces are thermosetting resin and the polypropylene based resin serving as the base resin is a thermoplastic resin so that little mutual interaction occurs between the coated film pieces and the base resin, and the coated film pieces which can not be finely dispersed in the base resin prevents the recycled resins from being integrally kneaded, resulting in remarkably deteriorated mechanical properties of the recycled resin product. Consequently, the usable range of the recycled resin product is largely restricted.

For this reason, removal of the coated film is absolutely necessary in the case that the resin products are recycled with the coated resin products. As disclosed at page 3 to 9, NO. 5, Vol. 46, in Technical Booklet "Automobile Technology" edited and published in 1992 by the "Automobile Technology Association", of Japan, there are many mechanical, physical and chemical methods for peeling and removing the coated films from the coated resin product.

As the mechanical coated film removing method, there is a shot blasting method of blowing fine granular abrasive material toward the coated surface of the resin product to break the coating and then removing the broken coated resin, and a screen mesh method of removing coated film pieces mixed but not disssolved in the molten resin after finely crushing the resin product, melting the finer crushed product and filtering coarse resin roducts by extruding through a screen mesh.

The shot blasting method is acceptable from the viewpoint that poisonous substances are not scattered and environmental safety is secured. However large shot blast equiment is required and coated film removing efficiency is not satisfactorily high. It is especially very difficult to apply this method for concaved, recessed or irregularly protruded parts. The screen mesh method although acceptable from the viewpoints as mentioned above, however, there arises a problem clogging because the screen mesh is clogged with undissolved coated pieces, causing extrusion force to be greatly increased. The results in extrusion quantity and productivity being degraded. Thus, the coated film can not be removed at a sufficiently high efficiency. Another drawback is that there often arises a necessity for replacing the screen mesh with a new one when the screen mesh is clogged with the coated film pieces, resulting in low production efficiency.

The physical removing method of the coated film uses a halogen based solvent or various kinds of organic solvents. A phenomenon of penetration of solvent into the boundary between the coated film and raw material or a phenomenon of expansion of the coated film is utilized for removing the coated film. However, this method is unacceptable from the viewpoint as mentioned above, and the coated film removing efficiency and the treatment capacity are comparative low, and moreover, there is a problem that the characteristics of the raw material may change.

As the chemical coated film removing method, there is known an organic acid salt method of chemically dissolving and removing the coated film by cutting an ether bonding in the proximity of a bridge point of the resin to be peeled in an ethanol aqueous solution containing, e.g., an organic salt.

This coated film removing method has a problem which requires a secondary treatment such as waste water treatment or the like, and moreover, the treatment efficiency is low and inefficient.

In addition, as an apparatus for removing coated film of a resin product, there is shown a prior art apparatus for peeling the surface of synthetic resin as shown in FIG. 22 that is an illustrative front view and disclosed in an official gazette of Japanese Patent Laid-Open Publication NO. 5-337941.

The peeling apparatus is such that a resin product, e.g., a side lacing 102 is conveyed between rotary members 103 and 104 each composed of a foamed synthetic resin by a pair of conveying rollers 101, and a conveying speed V of the side lacing 102 is lower than the rotational peripheral speed of the rotary members 103 and 104 so that cutting and high frictional forces are exerted on a coated film 102a of the side lacing 102 and a double sided adhesive tape 102b so as to cut and peel the coated film 102a of the side lacing 102 and the double sided adhesive tape 102b, and moreover, convey the side lacing 102 by a pair of conveying rollers 101.

With this peeling apparatus, since the rotary members 103 and 104 each composed of a foamed synthetic resin comes in contact with the resin product, the rotary members 103 and 104 are broken due to the brittleness while generating powder dust. For this reason, the peeling apparatus is not preferable from the viewpoint of working environment.

Another drawback is that this peeling apparatus is not suitable for a bent or curved resin product.

SUMMARY OF THE INVENTION

The present invention has been made in consideration of the aforementioned background.

An object of the present invention is to provide an apparatus for peeling and removing coated films from coated resin products which has an excellent coated film removing efficiency, excellent environment safety and excellent treatment capability and which can obtain a high quality of recycled resin product.

Another object of the present invention is to provide a method of peeling and removing coated films from coated resin products which assures that a hot resin to be crushed and pelletized is effectively cooled for improving productivity at the intermediate part of the whole steps.

According to one aspect of the present invention, there is provided an apparatus for peeling and removing a coated film on a resin product, wherein the apparatus comprises a shearing device for shearing and removing a protruded portion of the resin product; a end portion treating device for rolling the resin product by a pair of rollers of rollers and for changing cross-sectional shape; a coated film peeling device for peeling and removing the coated film from the resin product by applying a shear slipping stress between the resin product and the coated film; and a conveying device arranged in front of each of the device for conveying crushed and peeled film and resin products.

In addition, according to other aspect of the present invention, there is provided a method of peeling and removing a coated film from a resin product, wherein the method comprises the steps of shearing a protruded portion of the coated film on the resin product; changing the resin product by an opposing pair of rollers; peeling the coated film from the resin product by applying a shear slipping stress between the resin product amd the coated film; and conveying scraped coated resin film along conveying device.

BRIEF DESCRIPTION OF THE DRAWINGS

FIG. 11 is a sectional view showing that a coated film member is modified;

FIG. 13a, b, c and d are a sectional view showing operations of the upper surface coated film peeling device, respectively;

FIG. 16a is a sectional illustrative view of roller cooling means for the coated film peeling device;

FIG. 16b is a cross-sectional view of the roller cooling means taken along line IV—IV in FIG. 15a;

FIG. 18a and b are illustrative views showing a coated film adhesion remaining rate and a coated film peeling rate;

FIG. 22 is an illustrative side view of a conventional coated film peeling apparatus.

DESCRIPTION OF THE PREFERRED EMBODIMENTS

The present invention will now be described in details hereinafter with reference to the accompanying drawings which illustrate preferred embodiments thereof.

Figure 1:
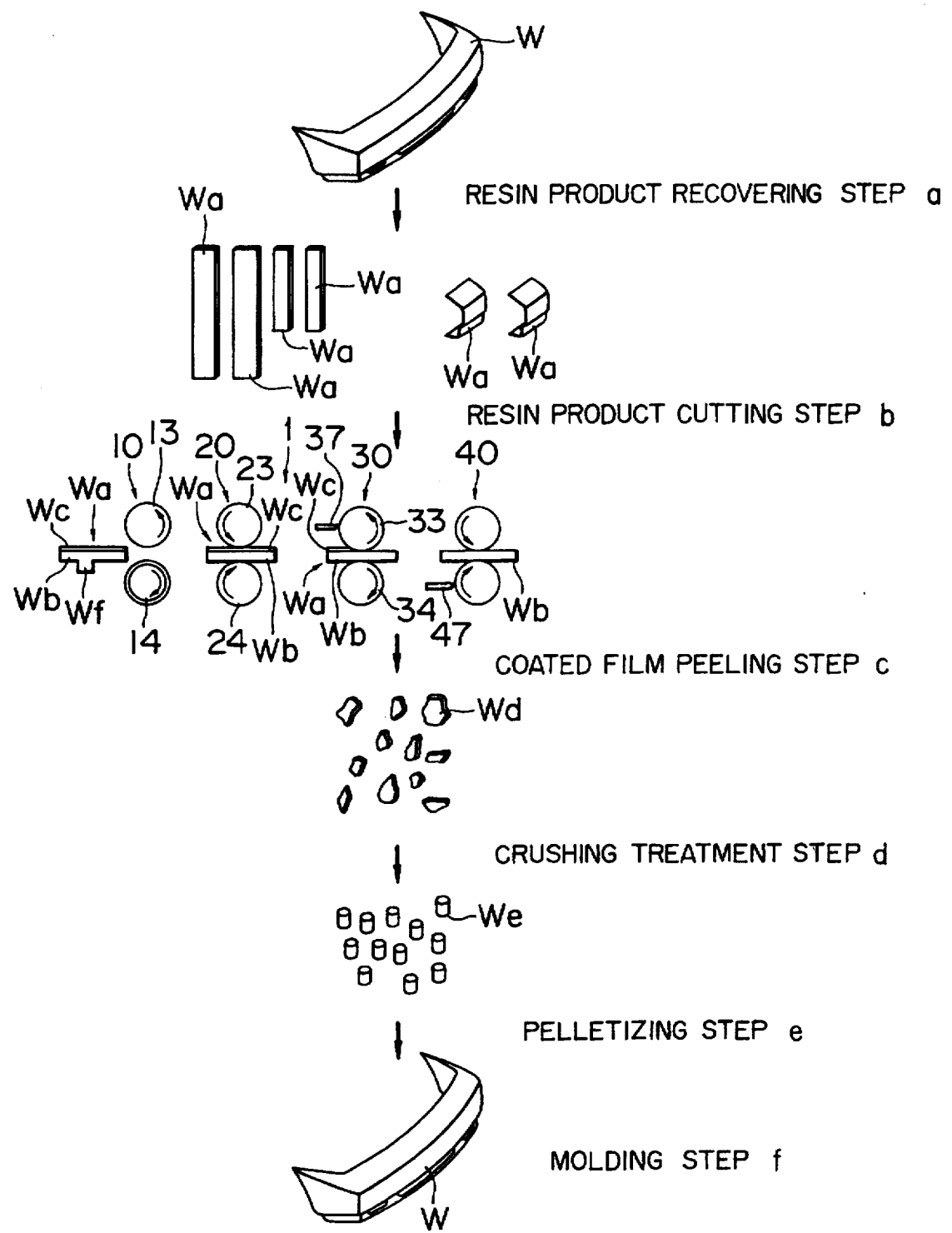
FIG. 1 is a schematic perspective view illustrateing a recycling process of resin coated products.

In FIG. 1, description is made with respect to the case that a resin bumper, i.e. a comparatively larger part of a vehicle is recovered and recycled.

FIG. 1 is an illustrative view which shows the outline of a method of recycling coated resin products for which a coated film peeling/removing apparatus constructed in accordance with an embodiment of the present invention is used.

The outline of the recycling method will be described with reference to FIG. 1. A bumper W derived from a production or assembly line as a defected article in a production line or taken from a used and discarded vehicle is recovered in a resin product recovering step a at which metallic parts are removed, and thereafter, a resin member Wa having a predetermined width is cut from out of the bumper W at a next resin product cutting step b.

The resin member Wa is treated in a next coated film peeling step c so that a coated film Wc is peeled and removed from the resin member Wb through a coated film peeling/removing apparatus 1 to be described later.

After the coated film Wc is peeled and removed from the resin material at the coated film peeling step c, the resin member Wb is crushed at a next crushing treatment step d by operating a shredder or a similar machine to provide a crushed material Wd.

Then, the crushed material Wd is fed to, e.g., an extruder at a subsequent pelletizing step e at which the crushed material Wd is displaced by rotation of a screw in a barrel of the extruder while it is heated by a band heater. As the crushed material Wd is displaced outwardly in the barrel, it is molten and extruded through a die to provide pellets We each having a predetermined contour. At this time, remaining coated film pieces are removed from the molten resin throuh of a screen mesh disposed at the foremost end of the barrel. It should be added that a treating capacity can be elevated by automatically changing the screen mesh with another one so as to improve a productivity.

The pellet We obtained at the pelletizing step is added with pellets produced from virgin (new) polypropylene based resin or the like so that a resin product such as a bumper W or a similar product is again molded.

The crushed material Wd is pelletized at the pelletizing step, but if the crushed material Wd is finely crushed, the pelletizing step e may be eliminated depending on the crushed state of the pellet We.

Next, the coated film peeling/removing apparatus 1 for peeling and removing the coated film Wc from the resin material Wb at the coated film peeling step c will be described below.

Figure 2:
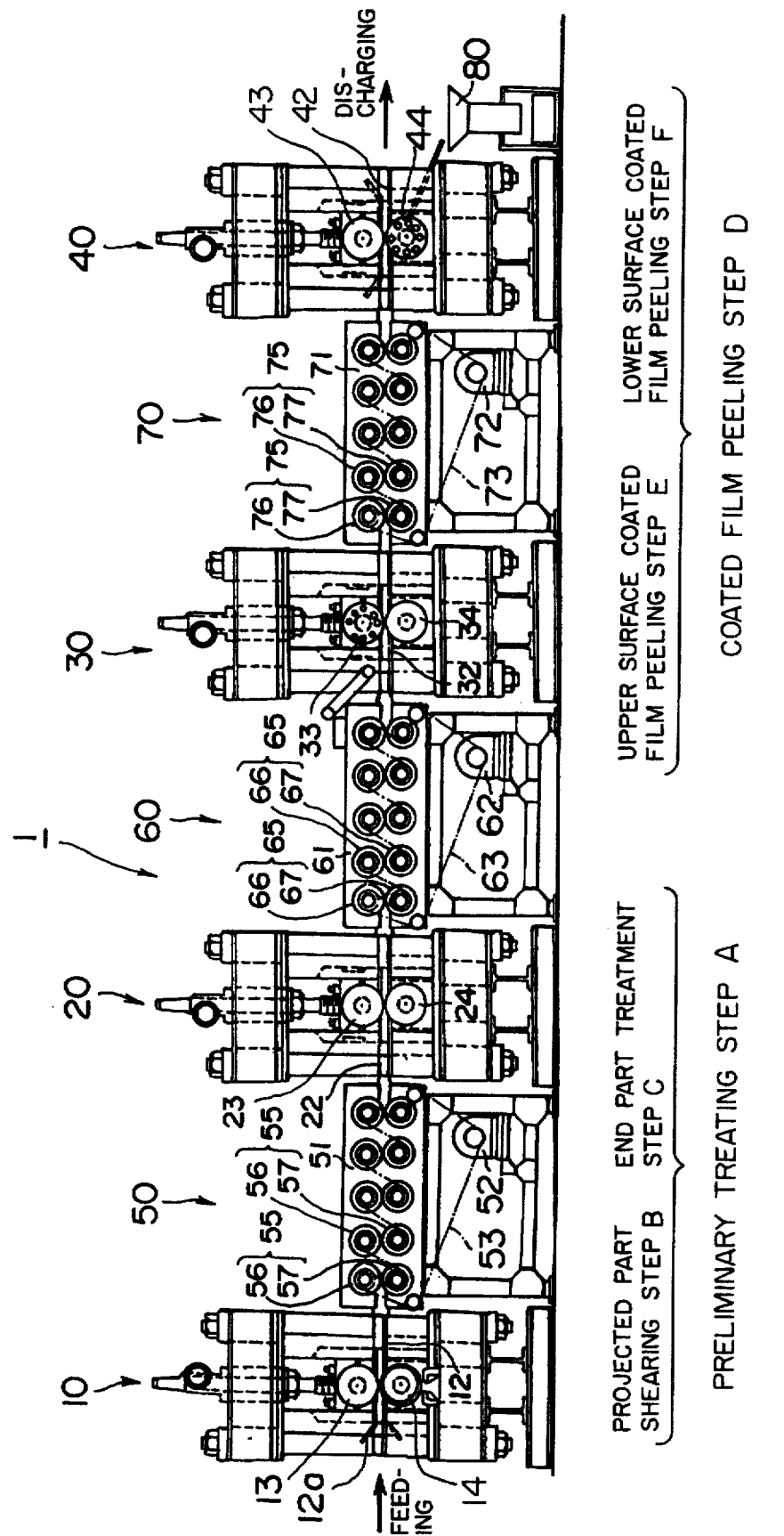
FIG. 2 is a side view of a resin coating peeling removing apparatus schematically shown in FIG. 1.

FIG. 2 is the whole side view of the coated film peeling/removing apparatus 1. The coated film peeling/removing apparatus 1 includes a preliminary treatment step A comprising a projected part shearing step B of cutting projected parts Wf such as ribs or the like protruding from the resin member Wa cut to have a predetermined width at the resin product cutting step b to provide a flat plate-like resin a and an end part treating step C of treating the end part shape of the resin member Wa modified to a flat plate-shaped resin at the projected part shearing step B. In addition, the coated film peeling/removing apparatus 1 includes a coated film peeling step D comprising an upper surface coated film peeling step E of peeling from the resin material Wb the coated film Ec coated on the upper surface of the resin member Wa of which shape is regulated at the preliminary treatment step A and a lower surface coated film peeling step F of peeling from the resin material Wb a coated film formed on the lower surface of the resin member Wa.

The coated film peeling/removing apparatus 1 includes a protruded part shearing device 10 and an end part treating device 20 adapted to function corresponding to the protruded part shearing step B and the preliminary treatment step C, a coated film peeling device provided corresponding to the coated film peeling step D, and the coated film peeling device includes an upper surface coated film peeling device 30 and a lower surface coated film peeling device 40 corresponding to the upper surface coated film peeling step E and the lower surface peeling step F. And, conveying apparatuses 50, 60 and 70 are provided between the respective devices 10, 20, 30 and 40.

Next, the foregoing devices will successively be described below. The projected part shearing device 10 includes a guide portion 12 for conducting to the conveying device 50 the resin member Wa fed from an inlet port 12, and includes an opposing pair of support roller 13 and a shear roller 14 located opposite to each other at the intermediate position of the guide portion 12.

Figure 3:
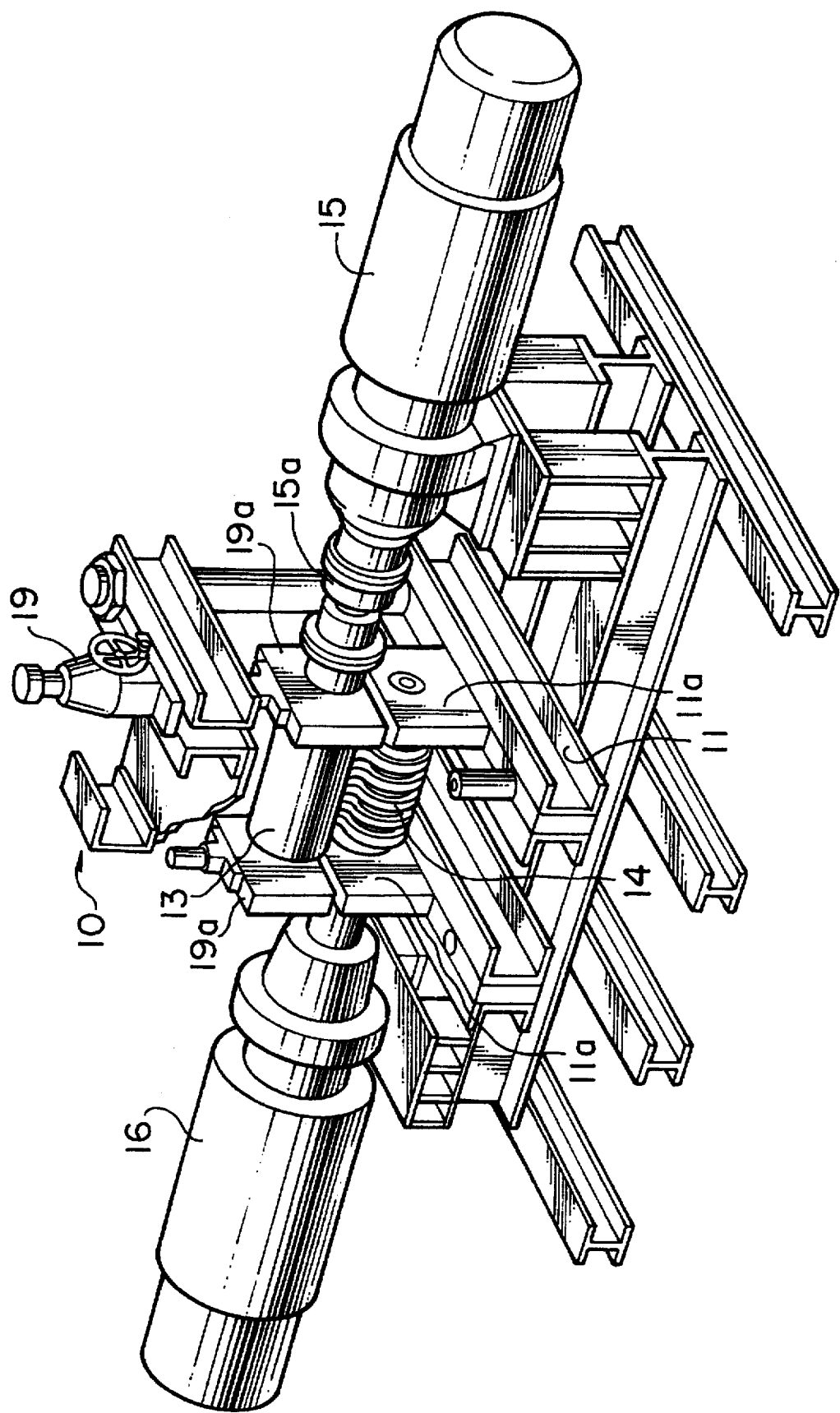
FIG. 3 is a perspective view showing essential components for supporting rollers.

As shown in FIG. 3, the support roller 13 is rotatably supported between a pair of support roller supporting members 19a vertically displaceably supported on a support frame 11 of the protruded part shearing device 10, and support roller 13 is rotationally driven by a rotational driving device 15 such as a motor equipped with a speed reduction unit joined thereto via a universal joint 15a. In addition, by raising or lowering a support roller supporting member 19a by raising/lowering means 19, the support roller 13 is vertically displaced to adjust a gap between the support roller 13 and the shear roller 14 corresponding to a thickness of the coated resin member Wa.

The shear roller 14 is rotatably supported relative to the frame 11 by a pair of shear roller supporting members 11a while it is located on the opposite side to the support roller 13, and it is rotationally driven by a rotational driving device 16 such as a motor equipped with a speed reduction unit.

Figure 4:
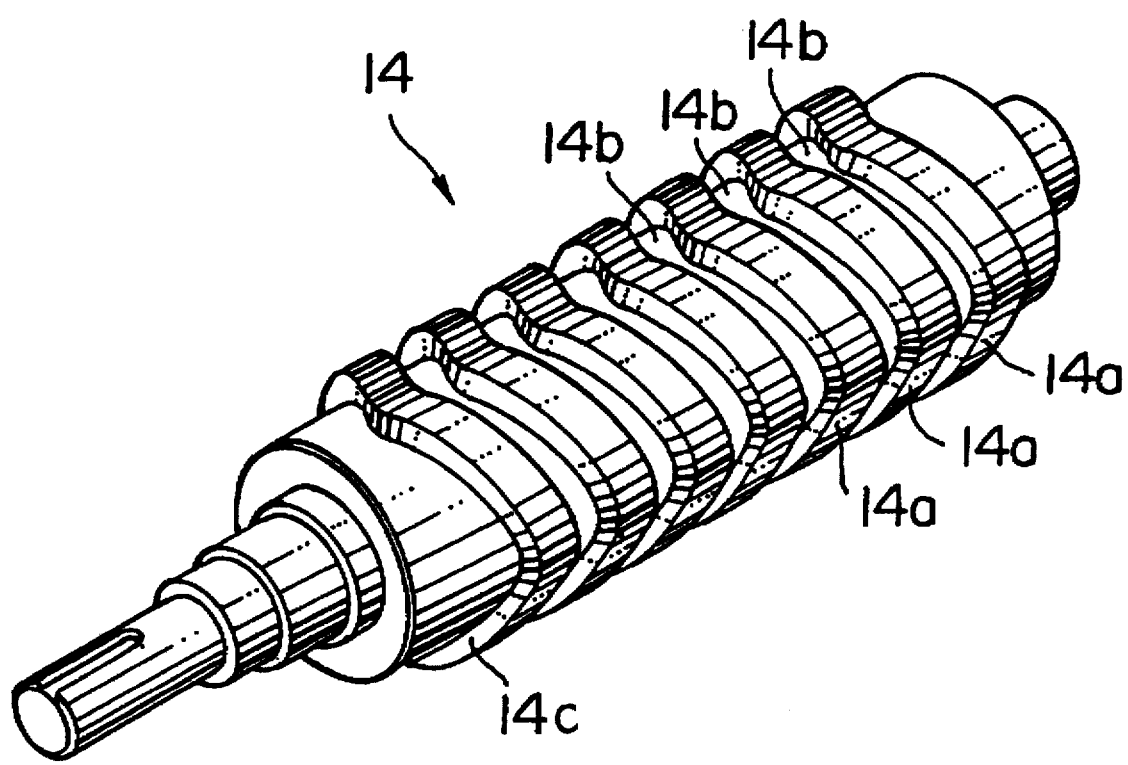
FIG. 4 is a perspective view of the supporting rollers for the protruded part shearing device.
Figure 5A:
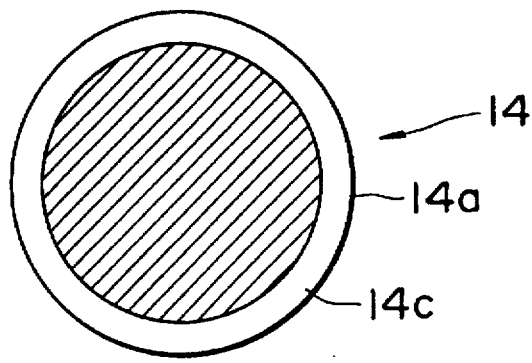
FIG. 5a is a sectional view of the shearing roller taken along line I—I in FIG. 4.
Figure 5B:
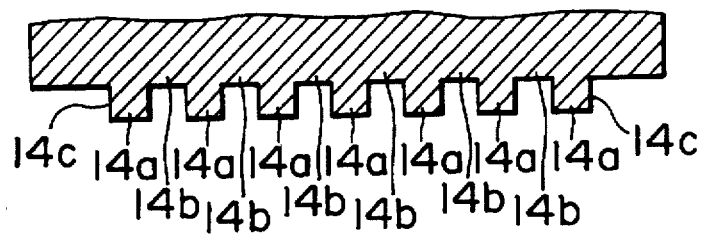
FIG. 5b is a fragmentary sectional view of the shearing roller taken along line II—II in FIG. 4.
Figure 5C:
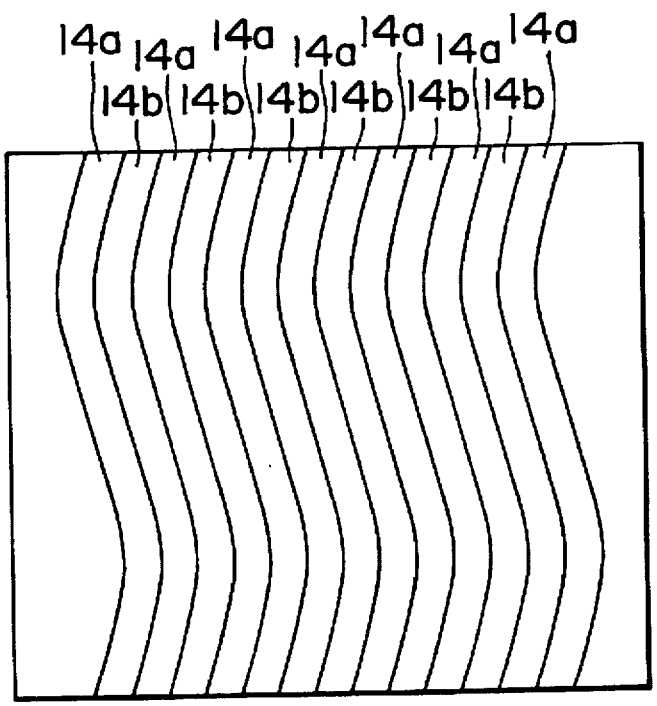
FIG. 5c is a developed view of the surface of the shearing roller.

The shear roller 14 is shown by a perspective view of FIG. 4, and as shown by a sectional view of the shear roller 14 taken along line I—I of FIG. 5a, a sectional view of the shear roll 14 along line II—II in FIG. 5b and a development view of the roller surface of the shear rolle 14 in FIG. 5c, a plurality of shearing blades 14a each comprising an annular projection smoothly extending in a snake-movement pattern on a column-like roller surface are formed in the direction of a roller rotational shaft in the equally spaced relationship via a plurality of annular grooves 14b each extending in a snake-movement pattern.

The support roller 13 and the shear roller 14 are rotationally driven by the rotational driving devices 15 and 16 in such a manner that the devces 15 and 16 are rotated in the opposite direction relative to each other so as to allow the resin member Wa fed in the inlet port 12a while clamped therebetween in cooperation with each other to be conveyed to the side of the conveying device 50, and moreover, the rotational circumferential speed of the shear roller 14 is larger than that of the support roller 13.

Figure 6:
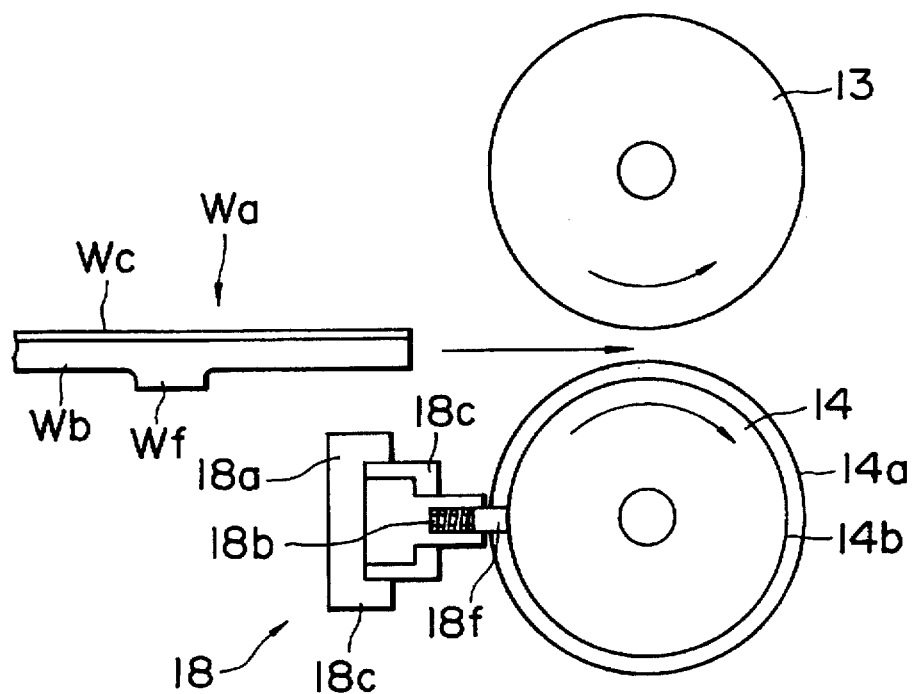
FIG. 6 is a schematic side view of the protruded part shearing device showing an operation of the protruded part shearing device.

With this construction, as shown in FIG. 6 that is an illustrative view of operation, as the resin member Wa including a protruded part Wf such as a rib or the like fed between the support roller 13 and the shear roller 14 each having a different rotational circumferential speed is conveyed in cooperation of the support roller 13 with the shear roller 14, the proruded part Wf is inserted in a groove portion 14b of the shear roller 14 and so that the protruded part Wf is sheared by a shear blade 14a formed along the surface of a roller and smoothly extending in the snake-movement pattern to exhibit a flat plate-like contour.

Figure 6A:
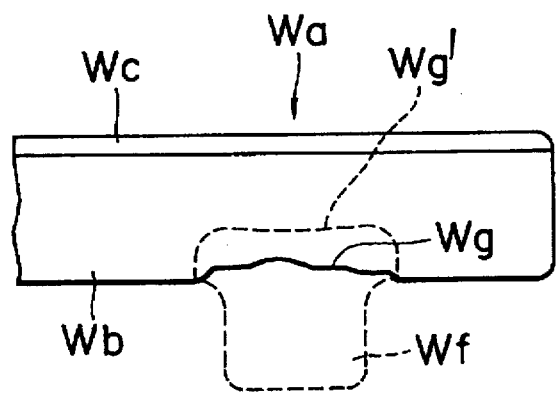
FIG. 6a is a side view showing that the protruded part is shorn from the molded poduct.

Since the shearing blade 14a is formed to smoothly extend in the snake-movement pattern, the protruded part Wf is smoothly cut not only without any collision of the protruded part Wf with the shearing blade 14a but also without any plucking of the protruded part Wf due to the shearing blade 14a as represented by FIG. 6A.

There is a fear that removal of a protruded part can not be achieved attributable to adhesion of chips, dust or the like appearing on removal of the protruded part Wf by shearing to the groove portion 14b between the shearing blades 14a of the shear roller 14. To deal with the foregoing malfunction, the protruded part shearing device 10 is provided with a shear roller adhered material removing mechanism 18 for removing adhered material adhering to the groove portion 14b of the shear roller 14.

Figure 7:
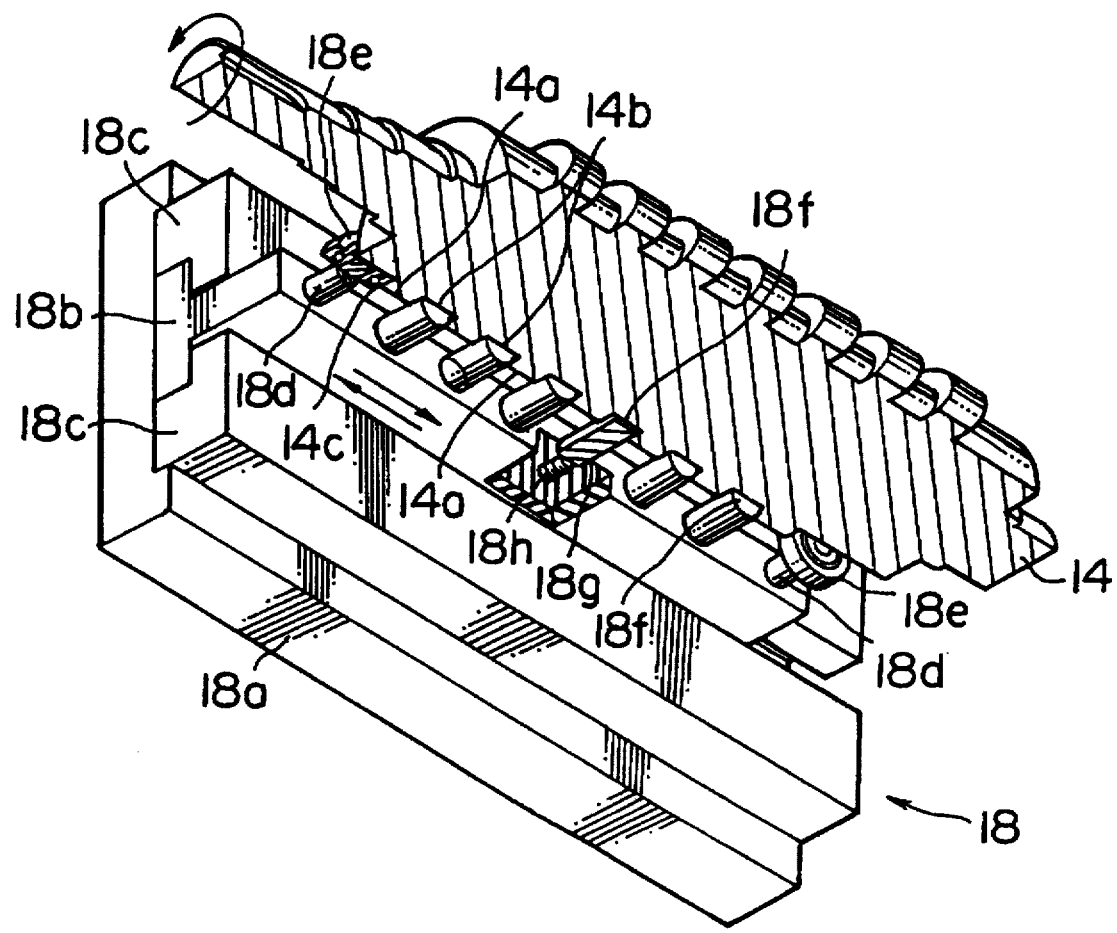
FIG. 7 is a partially sectioned perspective view of a shearing roller adhering mechanism of the protruded part shearing device.

As shown in FIG. 7 that is a fragmentary sectional view and FIG. 6 that is a cross-sectional view of the shear roller 14 taken along line III—III in FIG. 7, the shear roller adhered material removing mechanism 18 includes a base 18a having a substantially U-shaped base 18a and secured to the frame 11 in parallel with the rotational shaft line of the shear roller 14, a slider 18b having a substantially T-shaped sectional shape and a pair of slide receivers 18c adapted to hold the base end of the slider 18b in the clamped state and allowing reciprocable movement of the slider 18b in the direction of the rotational axis line of the shear roller 14.

A pair of guide pins 18d adapted to hold side surfaces 14c of the shearing blade 14a and including guide rollers 18e rolling on the side surfaces 14c are disposed on the opposite sides of the top end of the slider 18b, and the slider 18b is constructed to reciprocably displace in the direction of the rotational axis line of the shear roller 14. In addition, a plurality of scraper pins 18f adapted to be fitted in respective grooves 14b formed in the shear roller 14 are disposed at the top portion of the slider 18b so as to allow the top portion to be resiliently biased toward the protruding direction by springs 18h fitted in guide holes 18g formed in the slider 18.

Thus, the adhering material adhering to the groove portion 14b formed on the rotating shearing roller 14 is displaced toward the direction of the rotational axis line of the shearing roller 14 as the shearing roller 14 rotates so that it is normally scraped by the head portions of the scraper pins 18r normally fitted in the respective grooves 14b.

The adhering material scraped down by the top portions of the scraper pins 18f drop in a receiving portion 18i disposed below the shearing roller 14, and it is conveyed out of the protruded part shearing device 10 by a conveyer (not shown) or the like.

The resin member Wa treated to exhibit a flat plate-like contour with the protruded portion Wf sheared and removed therefrom by the protruded part shearing device 10 is fed to conveying device 50, and it then is conveyed to an end part treating device 20 adapted to function as a next end part treating step C by the conveying device 50

Figure 8:
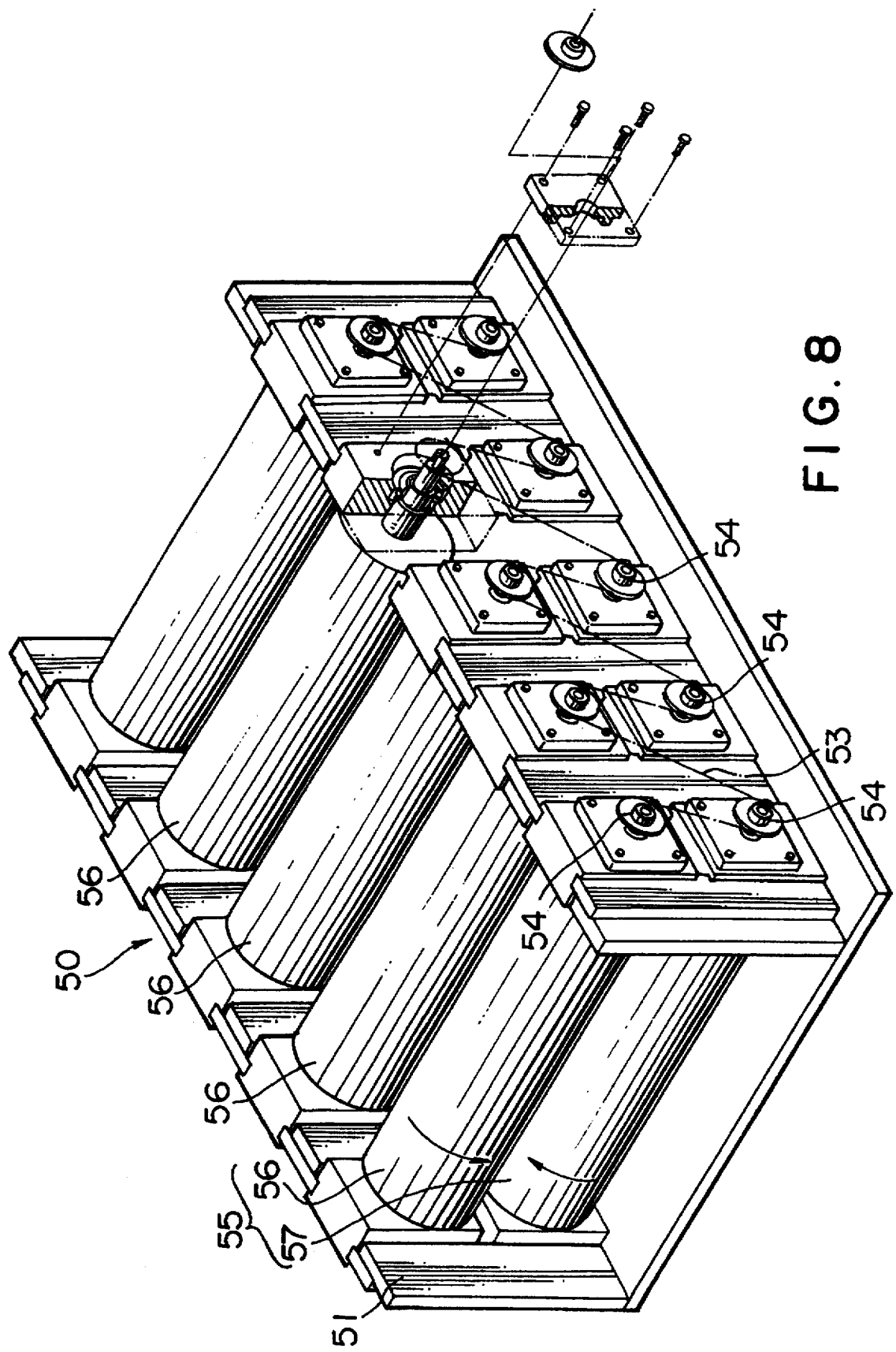
FIG. 8 is a perspective view showing a conveying device for the resin coating peeling/removing apparatus.

As shown in FIG. 2 and FIG. 8, the conveying device 50 is such that five pairs of rollers 55 each comprising a coated film side conveying roller 56 and a resin material side conveying roller 57 rotationally driven via a power transmission means 53 and a pulley 54 of the like such as a chain and a belt or the like in this embodiment by a rotational driving device 52 are mounted on a frame 51.

The coated film side roller 56 and the resin material side roller 57 of each pair of rollers 55 located opposite to each other are rotationally driven in the reverse direction while having the resin member Wa fed from the protruded part shearing device 10 held in the clamped state so that the resin member Wa is conveyed to the side of the end part treating device 20. When the resin material Wa is delivered while it is clamped between the support roller 13 and the shearing roller 14 each having a different rotational circumferential speed, to assure that the resin member Wa curvedly deformed to the side of the coated film Wc is corrected to have a flat plate-like contour, a rotational speed of each of the coated film side roller 56 and the resin material side roller 57 is determined in such a manner that the rotational circumferential speed of the coated film side roller 56 is larger than that of the resin material side roller 57.

The end part treating device 20 includes a guide portion 22 serving to conduct the resin member Wa delivered to the conveying device 50 to a next conveying device 60, and moreover, it includes at the intermediate part of the guide portion 22 an opposing pair of coated film side rolling roller 23 and a resin material side rolling roller 24 located opposite to each other so as to improve a coated film peeling efficiency at the upper surface coated film peeling step E.

Figure 9:
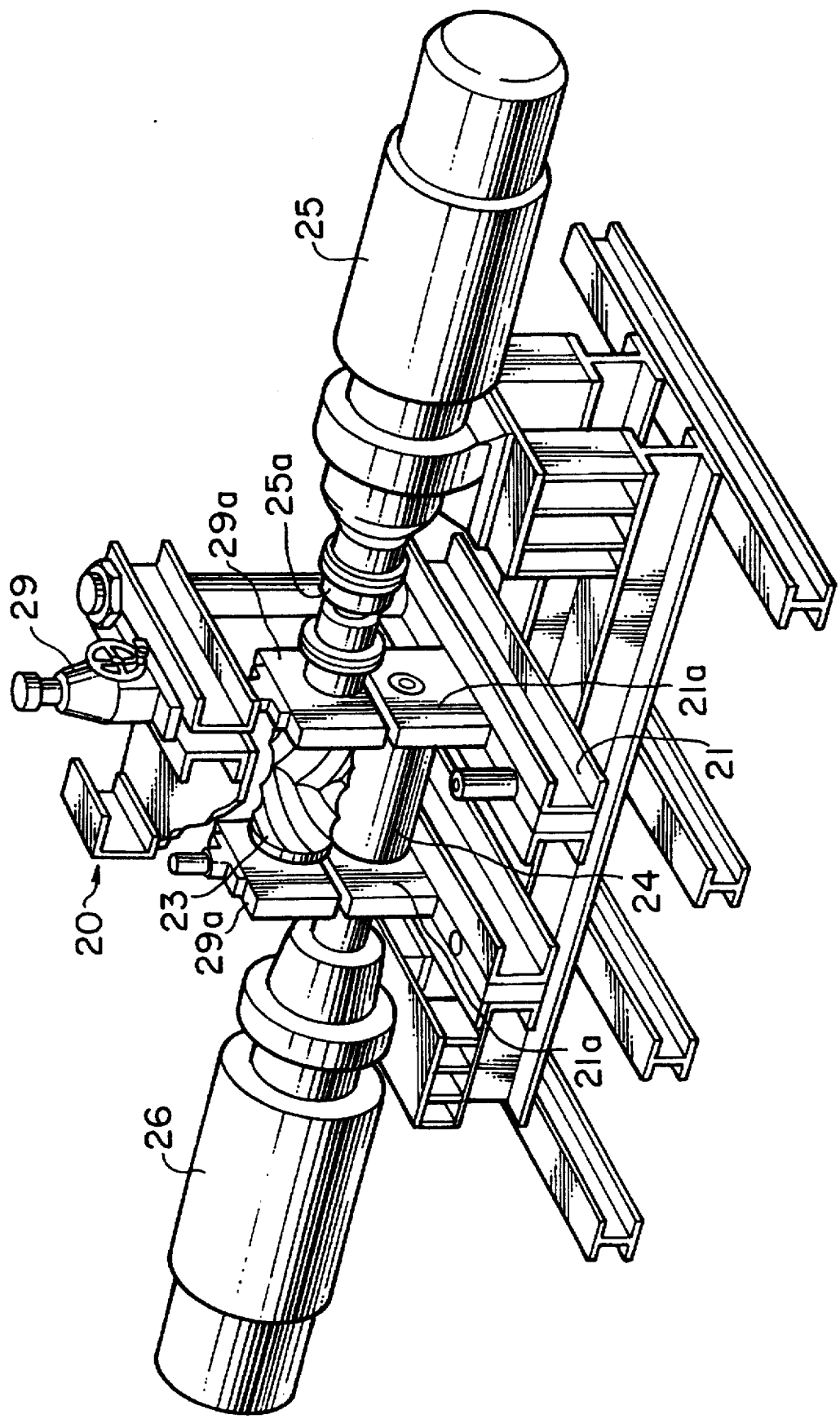
FIG. 9 is a perspective view showing an end part treating device for the resin coating peeling/removing apparatus.

As shown in FIG. 9, the coated film side rolling roller 23 exhibits a substantially column-shaped contour and it is rotationally supported between a pair of coated film side rolling roller support members 29a vertically displaceably supported by a support frame 21 of the end part treatment device 20 so that it is rotationally driven by a rotational driving device 25 such as a motor including a speed reduction unit or the like via a universal joint 25a. By raising and lowering a coated film side rolling roller support member 29 by raising and lowering means 29, the coated film side rolling roller 23 is vertically displaced whereby a gap between the coated film side rolling roller 23 and a resin material side rolling roller 24 is adjusted.

On the other hand, the resin material side rolling roller 24 is supported on a support frame 21 in the opposing relationship relative to the coated film side rolling roller 23 by a pair of supporting members 21a such that its opposite ends can be rotated by a rotational driving device 26 such as a motor including a speed reduction unit or the like. The coated film side rolling roller 23 and the resin material side rolling roller 24 are rotationally driven in the opposite direction so as to allow the resin member Wa fed between the coated film side rolling roller 23 and the resin material side rolling roller 24 to be rolled and be transferred to the side of a conveying device 60.

Figure 10:
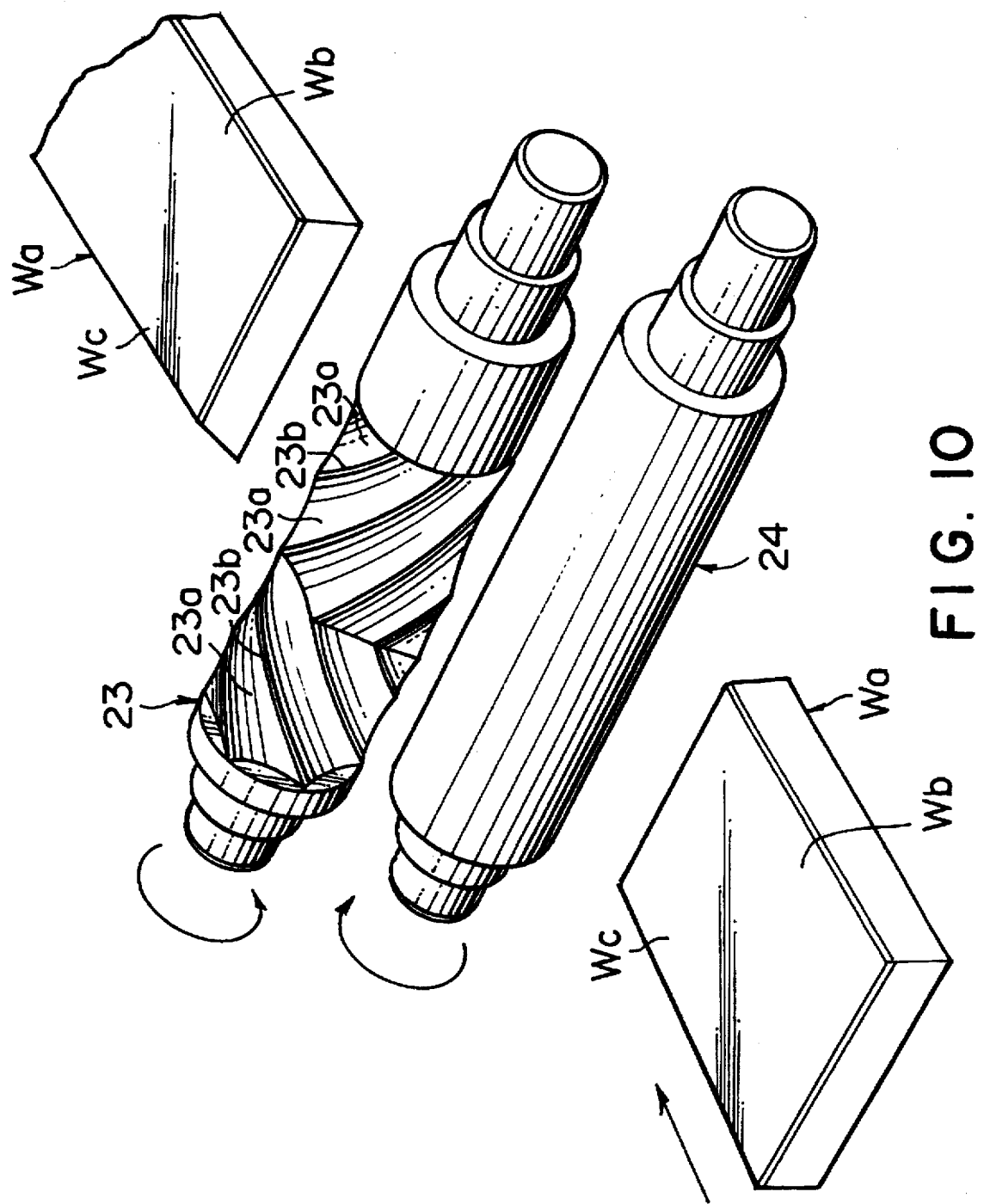
FIG. 10 is a perspective view showing a coated film roller and a resin material side roller for the end part treating device.

In addition, as shown in FIG. 10, a plurality of spiral grooves 23 each extending in the different spiral direction from the central side of the roller surface of the coated film side rolling roll toward the end side of the roller surface are formed on the roller surface of the coated film side rolling roller 23. Each spirally extending surface 23a has an arched-sectional contour and it is formed such that as the coated film side rolling roller 23 is rotated, the pressure contact position between the coated film side rolling roller 23 and the resin member Wa is successively dislocated from the end side of the coated film side rolling roller to the central side of the coated film side rolling roller 23.

Thus, the resin member Wa fed between the coated film side rolling roller 23 and the resin material side rolling roller 24 each rotationally driven is subjected to rolling by the rolling rollers 23 and 24 and expands also in the rotational axis line direction of rolling rollers 23 and 24. When the resin member Wa is subjected to rolling, the end part of the spirally extending groove 23a formed on the roll surface of the coated film side rolling roller 23b, i.e., the spiral projected part 23b plunges in the surface of the coated film Wc so that extension of the resin member Wa to the coated film Wc in the direction of the rotational axis line of the rollers 23 and 24 caused by the rolling is suppressed and the contact portion of the resin raw material side rolling roller 24 of the resin raw material Wb is more expanded. For example, shown by the sectional plane of the resin member Wa in FIG. 11(a), the resin member Wa formed by represented by a substantially sectional rectangle is modified such that the resin material Wb side is largely expanded than the coated film Wc side so that the resin member Wa having a substantially trapezoidal shape with the coated film Wc side as short side is formed.

The resin member Wa which is shape-corrected during the end part treatment step C to exhibit a substantially rectangular shape or a trapezoidal shape having the resin material Wb enlarged is successively nipped between a conveyance coated film side roller 66 and a conveyance resin raw material side roller 67 by a conveying device 60 including plural roller pair 65 comprising a conveyance coated film side roller 66 and a conveyance resin material side roller 67 rotationally driven by a rotational driving unit 62 such as a motor or the like via power transmission means 63, and thereafter it is conveyed and fed to an upper surface coated film peeling device 30 which serves as an upper surface coated film peeling step E.

The upper coated film peeling device 30 conducts the resin member Wa conveyed by the conveying device 60 between the coated film side roller 33 and the resin material side roller 34. A guide portion 32 for conducting the resin material Wb having the coated film Wc peeled therefrom by the rollers 33 and 34 is provided and a pair of coated film side roller 33 and resin material side roller 34 for peeling the coated film Wc are arranged at the intermediate part of the guide portion 32 in the opposing relationship.

Figure 12:
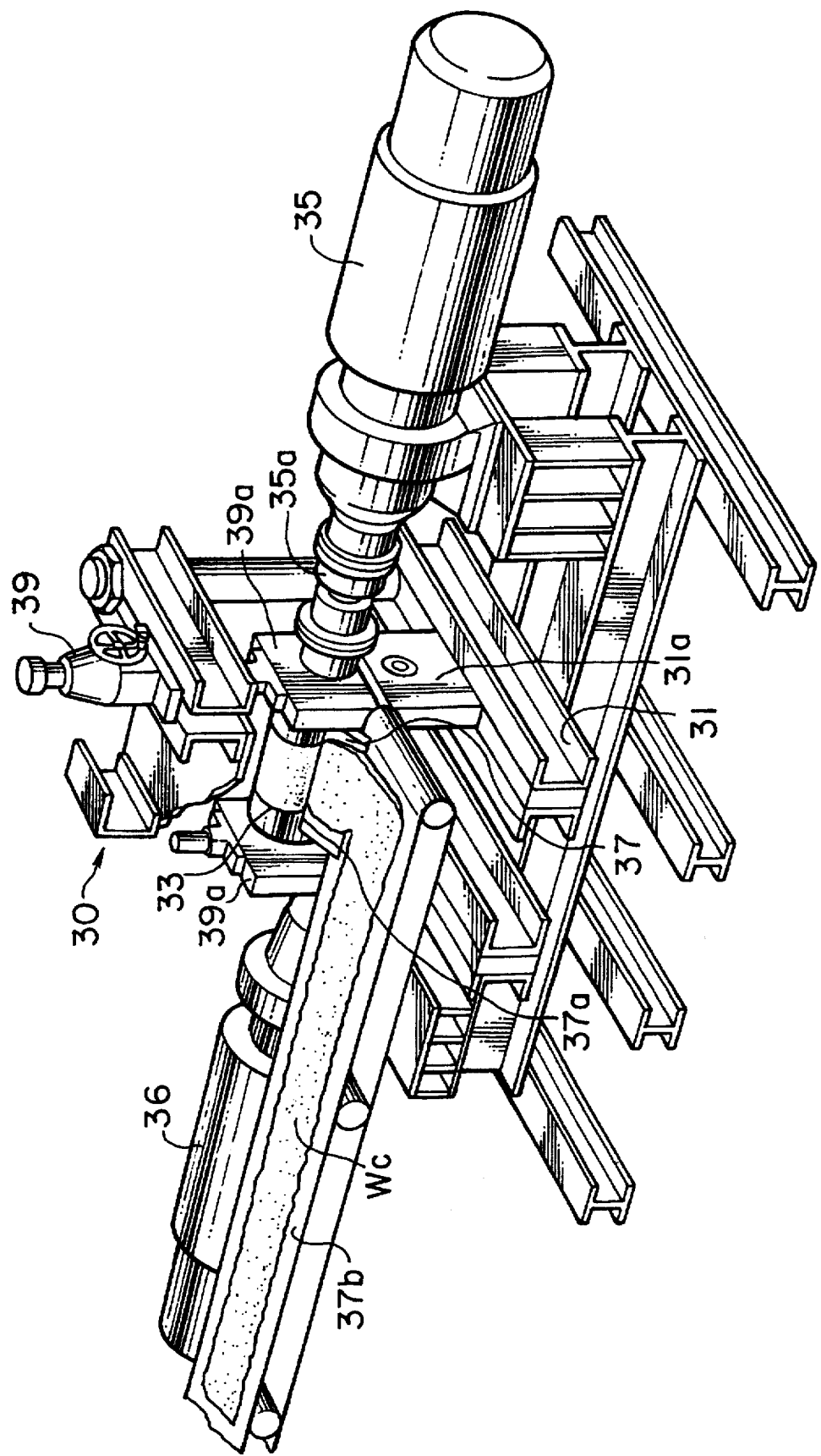
FIG. 12 is a perspective view showing an upper surface coated film peeling device.

The coated film side roller 33 and the resin material side roller 34 are made of a metallic material and each roller surface is mirror-finished or plated with chromium. As shown in FIG. 12, the coated film side roller 33 is rotatably supported between a pair of coated film side roller supporting member 39a vertically displaceably supported on a support frame 31 of the upper surface coated film peeling device 30, and it is rotationally driven by a rotational driving device 35 such as a motor including a speed reduction unit connected via a universal joint 35a. By raising or lowering the coated film side supporting member 39a by raising/lowering means 39, the coated film side roller 33 is vertically displaced to adjust a gap between the coated film side roller 33 and the resin material side roller 34.

On the other hand, the opposite ends of the resin material side roller 34 are rotatably supported opposite to the coated film side roller 33 on the support frame 31 via a supporting member 31a, and the resin material side roller 34 is rotationally driven by a rotational driving device 36 such as a motor including a speed reduction unit or the like.

To assure that the coated film side roller 33 and the resin material side roller 34 have a different rotational circumferential speed, e.g., the rotational circumferential speed of the resin material side roller 34 coming in pressure contact with the surface of the resin material Wb has a larger rotational circumferential speed of the coated film side roller 33 coming in pressure contact with the surface of the coated film Wc, and to impart a certain intensity of squeezing force to the resin material fed to the both rollers 33 and 34, the latter are rotationally driven in the opposite direction.

Therefore, the resin member Wa fed from the conveyance device 60 is subjected to rolling in the presence of the squeezing force given by the coated film side roller 33 and the resin material side roller 34, and a shear slipping stress is exerted on the coated film Wc and resin member Wb due to difference of relative rotational circumferential speed between both the rollers 33 and 34, whereby the coated film Wc is peeled from the resin material Wb.

In the case that a sectional shape of the resin member Wa fed between the coated film side roller 33 and the resin material side roller 34 is a rectangle as shown in FIG. 13a, the coated film Wc side coming in pressure contact with the coated film side roller 33 and the surface side of the resin material Wb coming in pressure contact with the resin material side roller 34 are deformed as if pushed out outwardly by the squeezing force given by the coated film side roller 33 and the resin material side roller 34 as shown in FIG. 13b. However, especially, at the end parts of the resin material Wb and the coated film Wc, the thrusting force given by the coated film side roller 33 and the resin material side roller 34 are not maintained so that a sufficient shear slipping stress does not arise between the resin material Wb and the coated film Wc, whereby the coated film Wc is incompletely peeled and there is a fear that the coated film Wc remains in the vicinity of the resin material Wb.

However, when the sectional shape of the resin member Wa is modified in the form of trapezoidal configuration having a short side identified by Wc during the end part treating step C as shown in FIG. 13c, the surface sides of the coated film Wc side and the resin material Wb are deformed as if pushed out outwardly by the squeezing forces given by the coated film side roll 33 and the resin material side roll 34. At this time, since the squeezing force given by the coated side roller 33 and the resin material side roller 34 is applied to the end part and a sufficient shear slipping stress arises between the upper surface of the resin material Wb and the coated film Wb, sufficient peeling of the coated film Wc is achieved in the vicinity of the resin material Wa, resulting in the remaining of the coated film Wc being avoided.

In FIG. 12, reference numeral 37 denotes a scraper for scraping the coated film adhering to the roller surface 33a of the coated film side roller 33 in the vicinity of the roller surface 33a of the coated film side roller 33. The coated film Wc scraped from the roller surface 33a of the coated film side roller 33 is conveyed and recovered from the upper surface coated film peeling device 30 by conveying device, e.g., a belt conveyer 37b.

Figure 14:
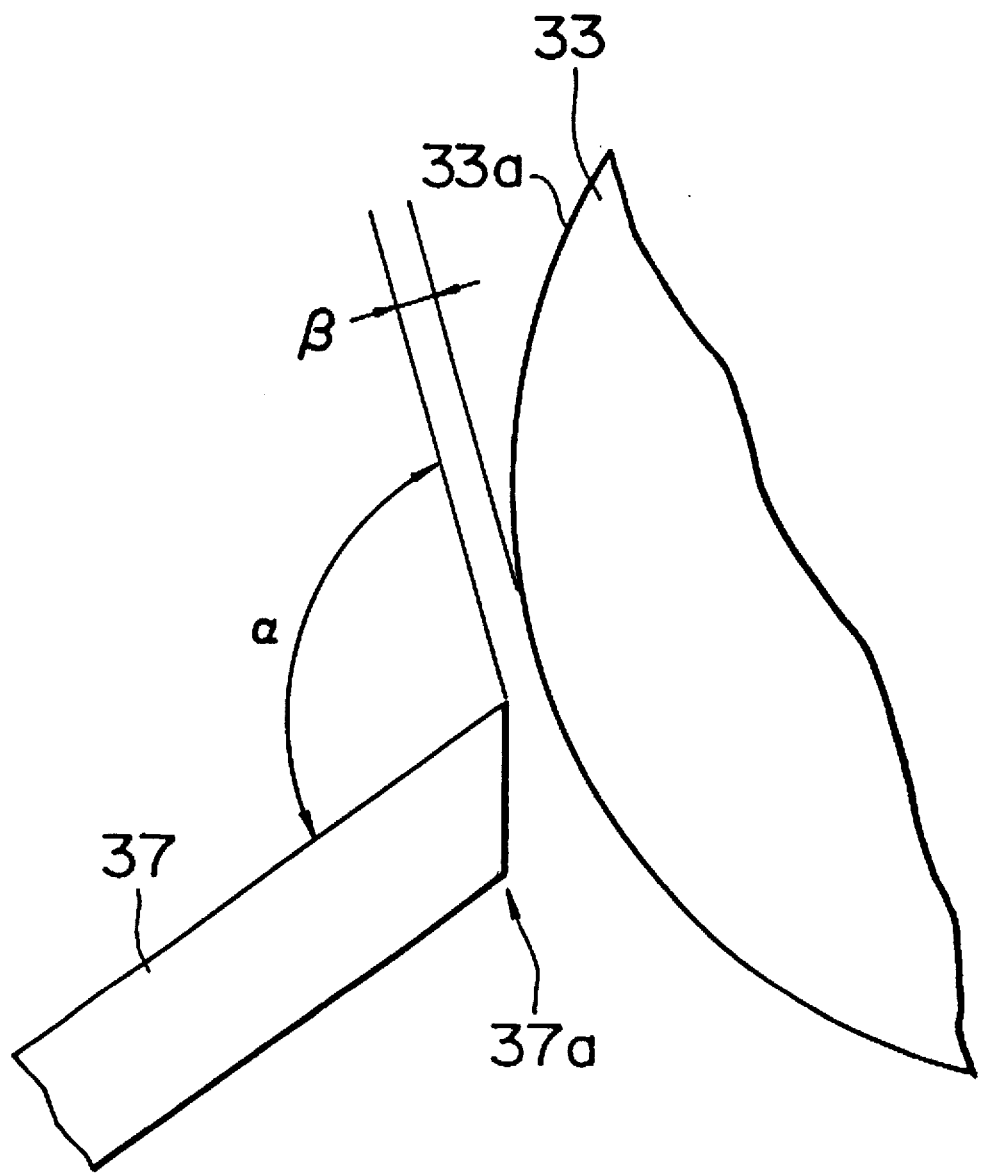
FIG. 14 is a side view of a scraper for scrape the coated film adhering to the roller surface.

The scraper 37 is made of a high carbon steel, e.g. S45C (JIS Standard), and as shown in FIG. 14 that is an enlarged view of essential components, a foremost end 37a of the scraper 37 exhibits an acute angle of about 45°, an angle a between the upper surface of the scraper 37 and the tangential line of the roller surface 33a is set to about 126°, and a gap $\beta$ between the roller surface 33a and the foremost end 37a of the scraper 37 is set to about 0.03 mm.

In addition, to assure that scraping and recovering of the coated film by the scraper 37 by reducing the adhering force of coated film Wc to the coated film side roller 33, cooling means for cooling the coated film side roller 33 is provided.

An embodiment of the roll cooling means will be described below with reference to FIG. 15 to FIG. 17.

Figure 15:
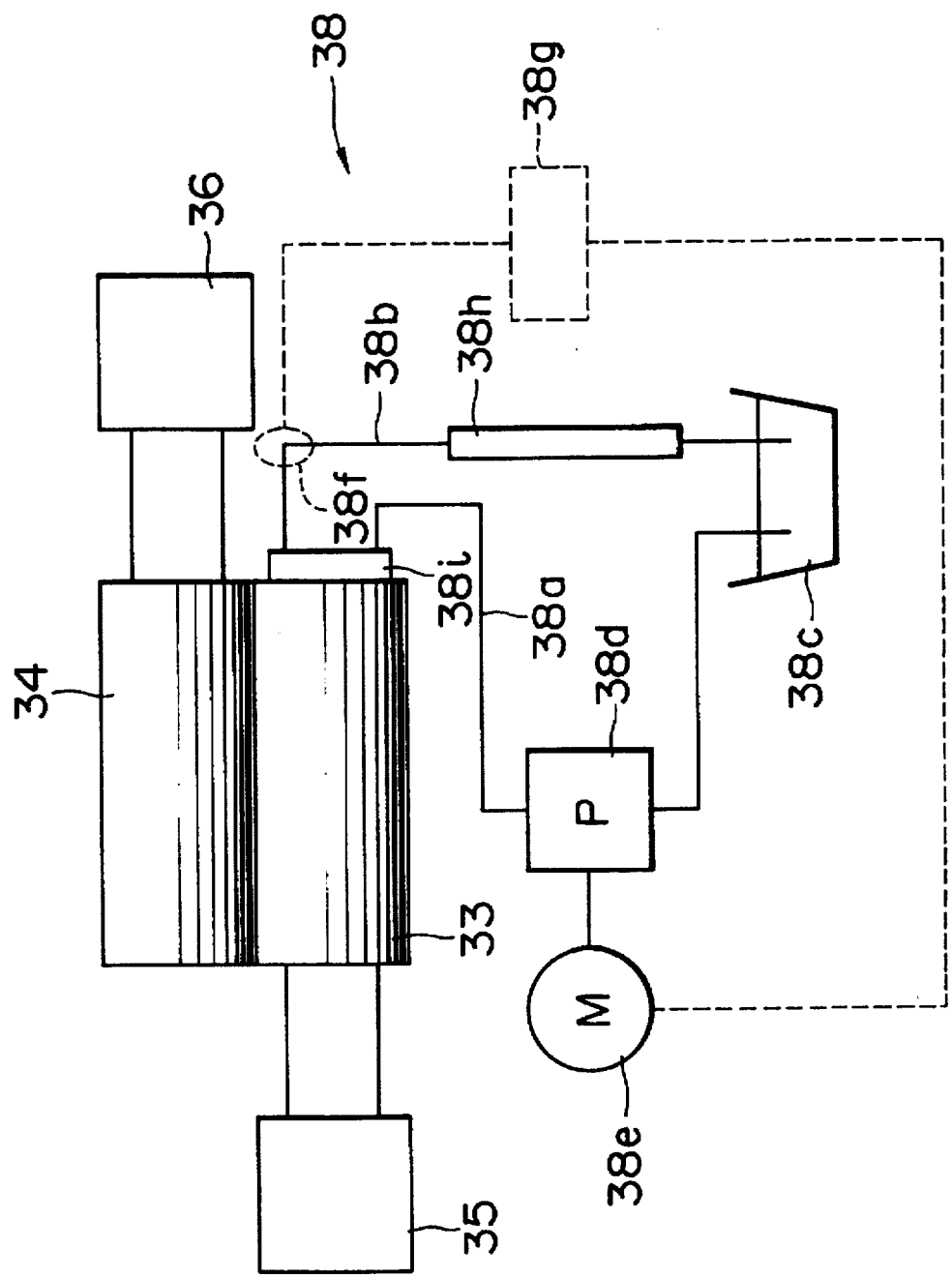
FIG. 15 is a schematic illustrative view of roll cooling means for the coated film peeling apparatus.

FIG. 15 is a schematic view which shows an outline of the roll cooling means. Reference numeral 34 denotes a resin material side roll rotationally driven by a rotational driving device 36 or a coated film side roller rotationally driven by a rotational driving device 35 or both rollers 33 and 34. In this embodiment, reference numeral 38 denotes cooling means for cooling the coated film side roller 33.

The cooling means 38 includes an inflow pipe 38a and an outflow pipe 38b for connecting a cooling liquid storing tank 38c to a connecting member 38i connected to the side which is not joined to the rotational driving device 35 for the coated film side roll 33 for supplying and discharging cooling liquid to the coated film side roll 33, a pump 38d for pumping the cooling liquid in the coated film side roller 33 from the cooling liquid storing tank 38c via the connecting member 38i is disposed in the inflow pipe 38a, and a temperature sensor 38f for detecting the temperature of the cooling liquid recovered from the coated film side roll 33 and a radiator 38h for cooling the cooling liquid are disposed on the outflow pipe 38a.

In addition, the cooling means 38 includes a pump driving/controlling circuit 38g for controlling the rotation of a rotational driving device 38e such as a motor or the like for rotationally driving the pump 38d in conformance with a temperature detecting signal outputted from a temperature sensor 38f.

Figure 17:
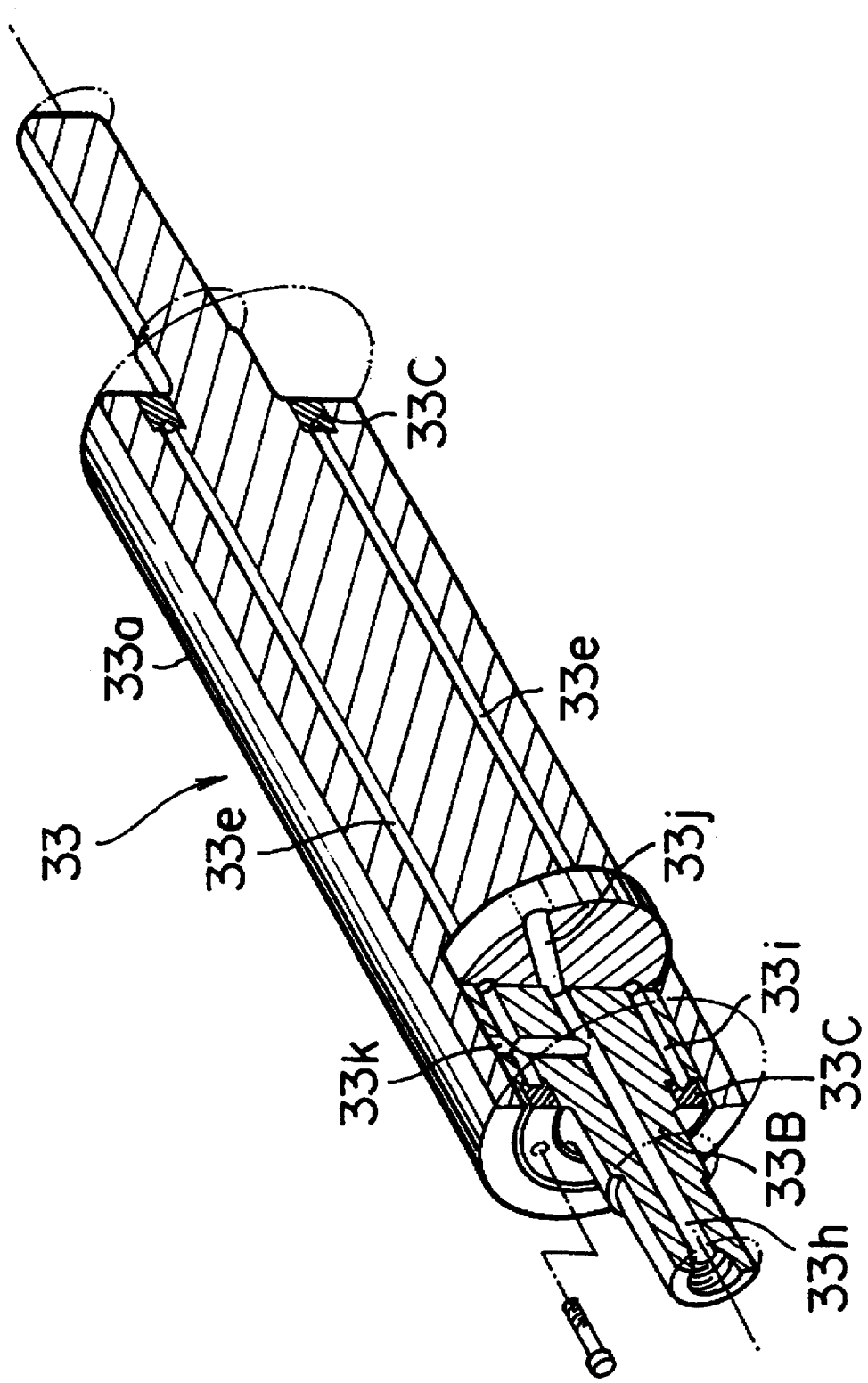
FIG. 17 is an exploded perspective view of the roller cooling means.

On the other hand, as shown in FIG. 16a that is a sectional view, FIG. 16b that is a cross-sectional view taken at line IV—IV and FIG. 17 that is a sectional exploded perspective view, the coated film side roll 33 includes a roll main body 33A, a joint member 33B and an annular member 33C. The roll main body 33A is constructed such that its one end side is rotatably supported by a coated film side roll supporting member 39a, and a rotational shaft 33b rotationally driven by the rotational driving device 35, an annular member fitting groove 33c surrounding the rotational shaft 35 and a joint member fitting recess 33d are formed on the other side. In addition, a plurality of cooling liquid piping passages 33e are formed in the vicinity of a roll surface 33a of the roll main body 33A for making communication between the annular member fitting groove 33c and the joint member fitting groove 33d.

The joint member 33B includes a main body portion 33f fitted into a joint member fitting groove 33d and a rotational shaft 33g projecting from the main body portion 33f to rotatably support in a coated film side roll support member 39a, and a cooling liquid discharge piping passage 33h having a bottom and extending from the rotational shaft 33g to the main body portion 33f along the rotational axis line, an auxiliary cooling liquid pipe 33i of which one end is communicating with a cooling liquid piping passage 33e formed in the roll main body 33A, a supply side joint pipe passage 33j for making communication between the auxiliary cooling liquid pipe passage 33i and the cooling liquid discharge pipe passage 33h, a discharge side communicating pipe passage 33k and an annular member fitting groove 33c of which other end is opened to the auxiliary cooling liquid pipe passage 33i are formed.

The annular member 33C has an annular contour, and by fitting the annular member 33C in the annular member fitting groove 33 of the roll main body 33A, a communication pipe passage 33s for making communication between the ends of adjacent cooling liquid pipe passage 33e is closed and forms a recirculation passage of the cooling liquid in the roller main body 33A.

On the other hand, the joint member 38i includes an inlet 38K connected to the inflow pipe 38a and a discharge port 38m connected to the delivery pipe 38k. The other end of the discharge port 38m is connected to the joint pipe 38p so as to allow the joint pipe 38p to be rotated relative to the joint pipe 38 threadably connected to one end of the rotational shaft 33g. An inner pipe 38g is disposed in the joint pipe 38p of which foremost end is inserted into a supply side connecting pipe passage 33j with an annular gap kept between the inner pipe 38g and the casing 38j. The casing 38j is disposed at a supporting member 39a located on the opposite side to the coating film side roller.

The temperature sensor 38f detects the temperature of the cooling liquid in the discharge pipe 38b, and as the temperature is elevated, an output value from the pump driving/controlling circuit 38g, e.g., an electric current is increased, a flow rate of cooling liquid by a pump 38d driven by a driving device 38e is increased and a quantity of pumped cooing liquid delivered from the foremost end of an inner pipe 38g while flowing through the inlet 38K of the joint member 38I and the inner pipe 38g via a pouring pipe 38a is increased so that the cooling liquid of the coated film side roller 33 rotationally driven is fed in the cooling liquid discharge pipe passage 33h.

The cooling liquid pumped in the supply side joint pipe passage 33 is further pumped in the cooling liquid pipe passage 33e, causing it to flow the respective cooling liquid pipe passages 33e, the auxiliary cooling liquid pipe passage 33i and the communication passage 33s. Subsequently, the cooling liquid is recirculated in the vicinity of the roll surface 33a to cool the coated film side roll 33, especially, the roll surface 33a, whereby elevation of the temperature of the roll 33 is suppressed.

The cooling liquid which has cooled the cooling liquid side roller 33 flows from the discharge side connection pipe passage 33k to the discharge pipe passage 33h and further through the joint pipe 38p so that it is pumped in a radiator 38h via the discharge port 38m of the joint member 38i and the discharge pipe 38b, and subsequently, after heat radiating and cooling in the radiator 38h, the cooling liquid is recovered in the cooling liquid storage tank 38C.

When the coated film side roller 33 is cooled and the temperature of cooling liquid detected by the temperature sensor 38f is lowered, output from the pump driving/controlling circuit 38g is reduced and a quantity of cooling liquid to be fed to the roller is reduced with the result that the temperature of the coated film side roller is controlled to assume a constant level.

FIG. 18a is a diagram which shows the relationship between the temperature of cooling liquid discharged from the coated film side roller 33 and detected by the temperature sensor and an adhesion remaining rate of the coated film Wc on the roll surface 33a of the coated film side roller 33 after the coated film Wc adhering to the coated film side roller 33 is scraped by the scraper 37 from the roller surface of the coated film side roller 33. FIG. 18b is a diagram which shows the relationship between a coated film peeling rate when the coated film Wc is peeled by the coated film side roller 33 and the resin material side roller 34 and a temperature of cooling liquid detected by the temperature sensor. As is apparent from FIG. 18a and FIG. 18b, under the condition that the coated film side roller 33 is maintained at a temperature than a predetermined temperature, especially, when the cooling liquid discharged from the coated film side roller 33 at a temperature of 40° C. or less, reduction of a coated film adhesion remaining rate to the coated film side roller 33 is remarkable, and it is possible that the coated film peeling rate is maintained at a high level.

The resin material Wb having the coated film Wc on the resin material upper surface peeled from the upper coated film peeling device 30 is conveyed to a lower surface coated film peeling device 40 for executing as a next lower surface coated film peeling step F by a conveying device 70.

A conveying device 70 includes plural pairs of rollers 75, i.e., in this embodiment, five pair of rollers composed of upper rollers 76 and the lower rollers 77 each rotationally driven by a rotational driving device 72 via power transmitting means 73, and the rollers 75 and 77 are placed on a frame 71.

The conveying device 70 arranged between the upper surface coated film peeling device 30 and the lower surface coated film peeling device 40 is rotationally driven by a rotational driving device 72 such as a motor or the like via power transmitting means 73 such as a chain, a belt or the like, and in this embodiment, five pairs of rollers 75 including an upper roll 76 disposed on the coated film side roller 33 side arranged on the upstream side and a lower side roller 77 disposed on the resin material side roll 34 side are arranged in the frame 71.

The upper roller 76 and the lower roller 77 disposed in the opposing relationship in the pair of rollers 75 cooperate with each other to hold in the clamped state the resin material Wb fed from the upper side coated film peeling device 30, subsequently, they are rotationally driven in the opposite direction so as to transfer the resin material Wb to the lower surface coated film peeling apparatus 40 side. Since the coated film side roller 33 is rotationally driven at a rotational circumferential speed larger than that of the resin raw naturale side roller 34 when the resin material Wb is squeezed between the coated film roller side 33 and the resin material side roller 34 each having a different circumferential speed and then peeled therefrom, to correct the resin material curvedly deformed in the downward arched contour to a flat plate-like contour, the rotational speed each of the upper roller 76 and the lower roller 77 is determined such that the circumferential speed of the lower roller 77 becomes larger than the circumferential speed of the upper roller 76.

A lower surface coated film peeling device 40 includes a guide portion 42 for conducting the conveyed resin material Wb to a recovering portion such as a next hopper 80 or the like, and a pair of resin material side roller 43 and coated film side roller 44 for peeling a coated layer (not shown) applied to the resin material are arranged at the intermediate part of the guide portion 42 in the opposing relationship.

Figure 19:
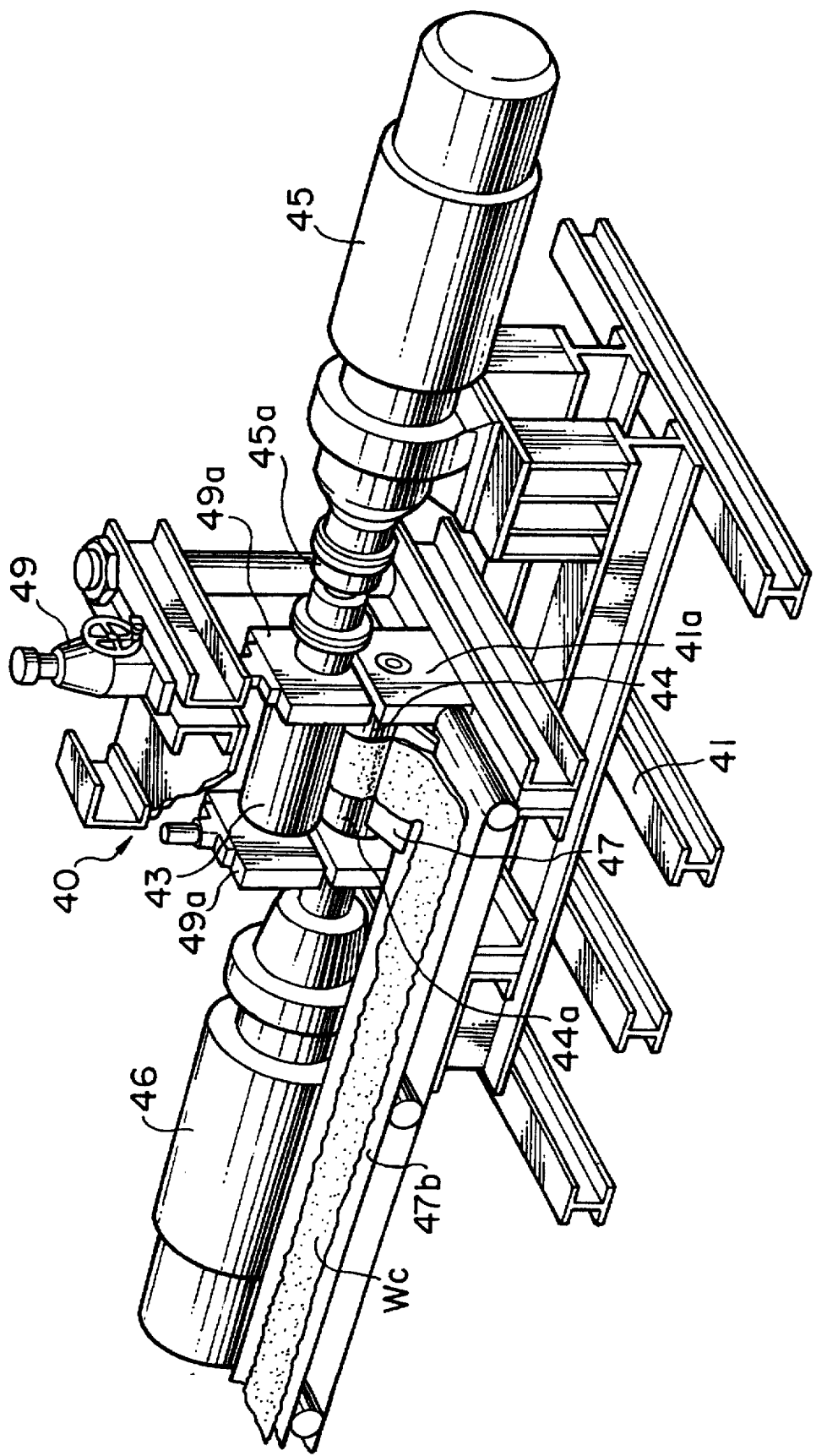
FIG. 19 is a perspective view which shows of the essential component of a lower surface coated film peeling apparatus.

Shown in FIG. 19 that is a perspective view of essential components, the resin side roller 43 is supported by resin side roll supporting members 49a at its both ends on a support frame 41 of the lower coated film peeling device 40. The resin side roller 43 is vertically displaceably supported by raising/lowering means 49 and rotationally driven by a rotational driving device 45 via a universal joint 45a.

The resin side roller 43 and the coated roller 44 have a different rotational circumferential speed, and the coated film side roller 44 is rotationally driven at a rotational circumferential speed larger than that of the resin material side roller 43 and both the rollers 43 and 44 are rotationally driven in the opposite direction so as to roll the resin material fed between both rollers 43 and 44.

Thus, the resin material Wb is rolled by the squeezing force given by the resin raw material side roller 43 and the coated film side roller 44, and the coated film is peeled away from the resin material Wb based on the difference between the rotational circumferential speeds of both the rollers 43 and 44 due to the shear slipping stress appearing between the resin material Wb and the coated film applied to the lower surface of the coated film.

A scraper 47 for scraping the coated film adhering to the surface of the coated film side roller 44 is disposed in the vicinity of the roller surface 44a of the coated film side roller 44, and moreover, a belt conveyer 47b for conveying the coated film scraped by the scraper 47 is arranged in the vicinity of the roll surface 44a of the coated film side roller 44. In addition, to reduce the adhering force of the coated film to the coated film side roller 44 and facilitate the scraping of the coated film by the scraper 47, roller cooling means is provided in the same manner as the upper surface coated film peeling device 30.

In connection with the aforementioned embodiment, another embodiment of roll cooling means usable for an upper coated film peeling device 30, a lower coated film peeling device 40 and so forth will be described below with reference to FIG. 20.

Figure 20:
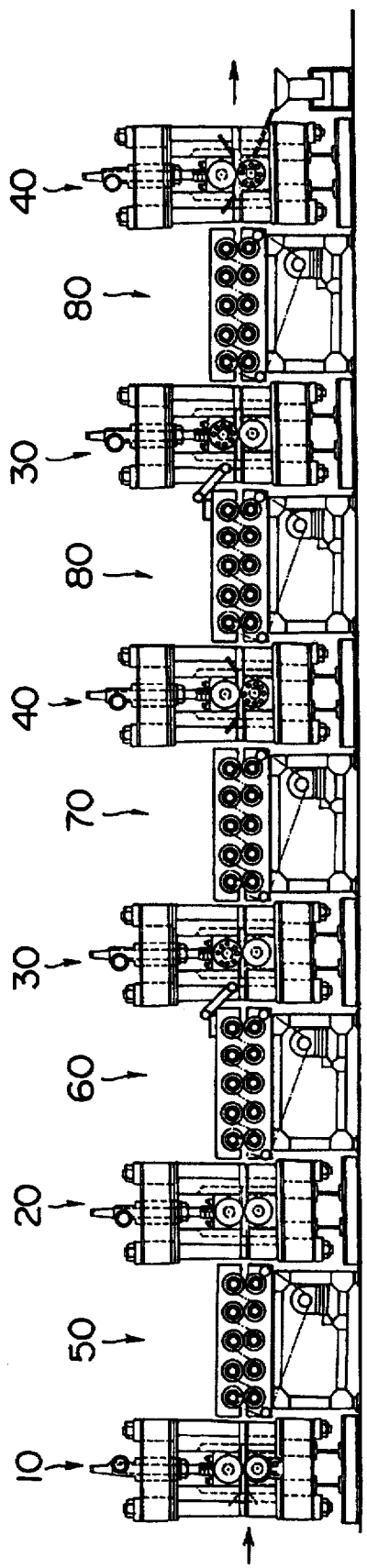
FIG. 20 is a side view of the whole coated film peeling removing apparatus for coated resin products.

Same components shown in FIG. 20 as those shown in FIG. 2 are represented by same reference numerals, and therefore, repeated description of them is eliminated. Cooling means 38 is such that a feed pipe 38a and a discharge pipe 38b for feeding to and discharging from a cooling liquid pipe a cooling liquid are connected to the end part which is not connected to a rotational device 35 of the coated film side roller 33 via a connecting member 38c.

A pump 38d for pumping a cooling liquid to a coated film side roller 33 is disposed at the other end of the feed pipe 38a, and a temperature sensor 38f for detecting the temperature of the cooling liquid discharged from the coated film side roller 33 and a radiator 38b for cooling the cooling liquid are disposed on the delivery pipe 38b. Since the radiator 38h is connected to the pump 38a, the cooling liquid pumped by the pump 38d is fed to the coated film side roller 33 via the feed pipe 38a and the connecting member 38j, and the cooling liquid discharged from the coated film side roller 33 via the coated film 38i is conducted to the pump 38d via the delivery pipe 38b, the temperature sensor 38f and the radiator 38h to thereby form a closed circuit for recirculation.

In addition, the cooling means includes a pump driving/controlling device 38g controlling the rotational speed of a rotational/driving device 38e such as a motor or the like in response to a temperature detecting signal from the temperature sensor 38f, and moreover, controlling the rotational speed of a cooling fan 38r for cooling the radiator 3h.

The temperature sensor 38f detects the temperature of the cooling liquid discharged from the coated film side roller 33, increases/decreases an output value from the pump driving/controlling circuit 38g, e.g., an electric current corresponding to the detected temperature, and moreover, increases or decreases the flow rate of the cooling liquid by the pump 38d to be driven by the driving device 38e so as to regulate a quantity of feeding of the cooling liquid to the coated film side roller 33 from the connecting member 38i. Further, the temperature sensor 38f controls the rotation of the cooling fan 38r for cooing the radiator 38h based on an output from the pump driving/controlling circuit 38g corresponding to the cooled liquid temperature detected by the temperature sensor 38f, e.g., increase or decrease of am electric current or ON or OFF.

Therefore, the temperature of the cooling liquid discharged from the coated film side roller 33 is detected by the temperature sensor 38, and a quantity of feeding of the cooling liquid to the coated film side roller 33 by the pump 38d and a quantity of radiated heat from the radiator 38h by the cooling fan 38r are regulated in conformance with the detected value so that it is possible to maintain the temperature of the coated film side roller 33 constant or lower than a predetermined value, enabling a coated film scraping efficiency from the roll surface 33a by the scraper to keep normal, and moreover, it is possible to reduce an adhesion remaining rate of the coated film Ec to the roller surface 33a.

In the above description, the coated film roller is cooled, but it is possible to cool the resin material side roll and both of the coated film side roll and the resin material side roll.

In the foregoing embodiment, description has been made with respect to the lower surface coated film peeling step E and the coated film peeling apparatus including the lower surface coated film peeling device 40 for executing the lower surface coated film peeling step E, and in the case that no coated film is applied to the lower surface of the resin member Wa, it is possible to eliminate the lower surface coated film peeling device 40. Further, coated film peeling is more reliably achieved by sequentially arranging a plurality of devices such as the upper surface coated film peeling device and the lower surface peeling device 40 or the like.

Figure 21A:
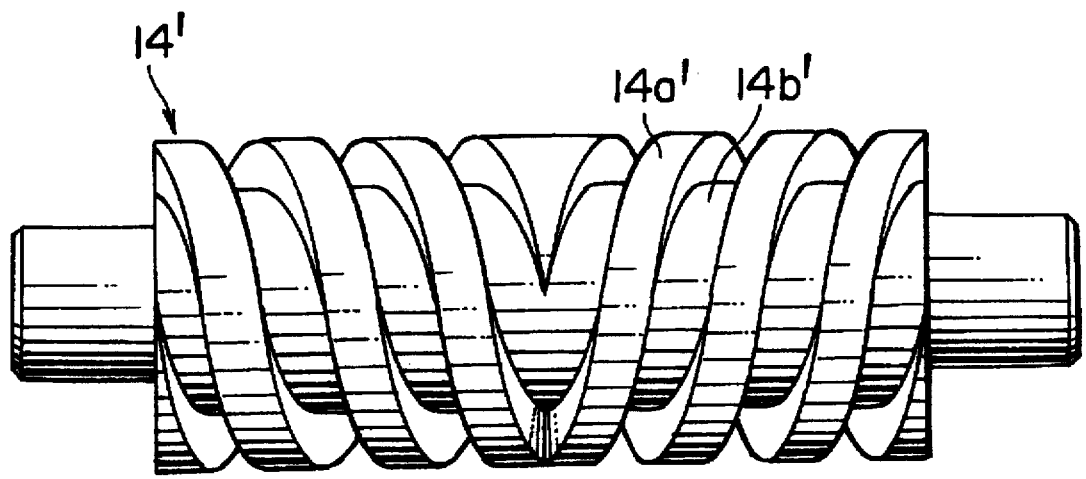
FIG. 21a is a front view of a shearing roller constructed according to another embodiment of the present invention.
Figure 21B:
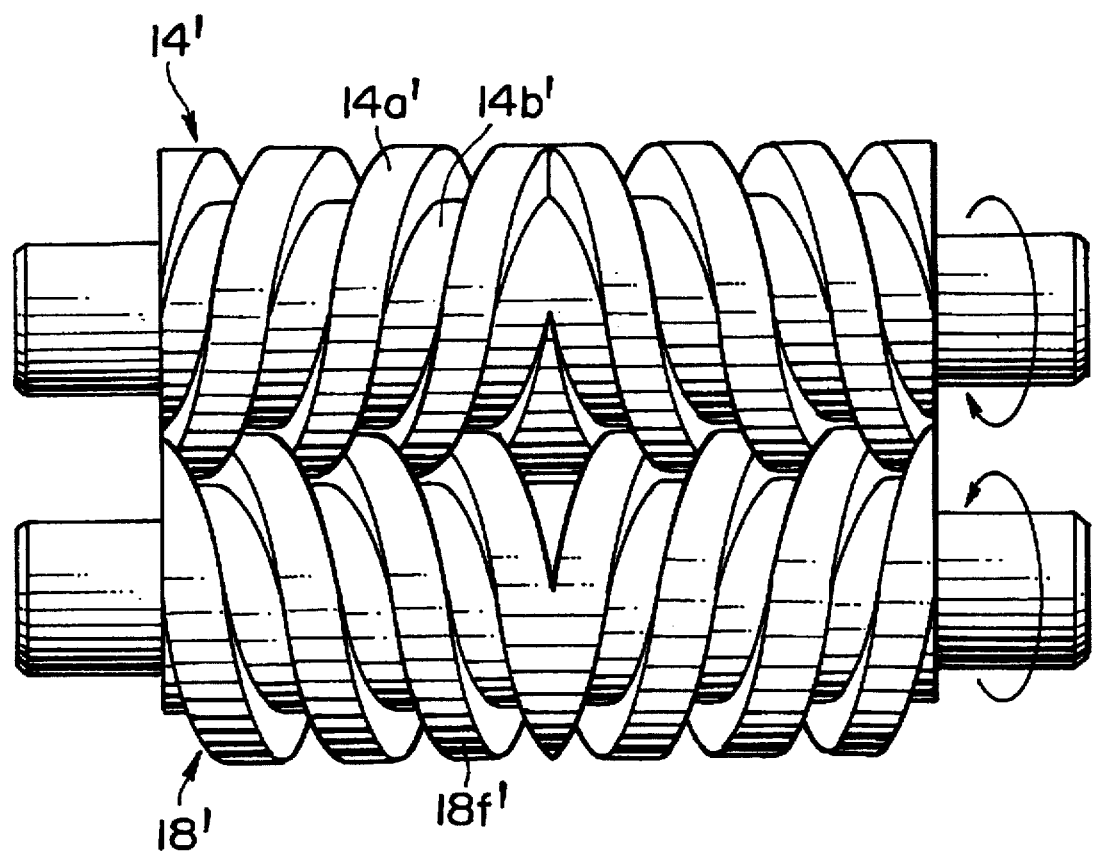
FIG. 21b is a front view of an adhesion article removing mechanism operatively associate with the shearing roller.

FIG. 21 shows another embodiment of shearing roller and an adhered article removing mechanism including the shearing roller for a projected part shearing device. In this embodiment, a spirally extending shearing blade 14a' extending in a different spiral direction is substantially symmetrical at the central part of the shearing roll 14', and a shearing roll adhered article removing mechanism is constructed such that a shearing roll 18' including a scraper blade 18f' meshes with the shearing roll 14' in the opposing relationship while a spirally extending scraper blade 18f' extending in the different spiral direction is received in the groove 14b' formed between adjacent shearing blades 14a'.

Thus, adhering articles such as cut chips or the like adhering to the interior of the grooves 14b' of the rotating shearing roller 14' are removed by scraping the scraper blade 18f' received in the grooves 14b' in the fitted state.

Components constituting each of the protruded part shearing device, the end part treating device 20, the upper coated film peeling device and the lower surface peeling device 40 with the exception of opposing rollers can basically be formed with the same structure, and components constituting each of the conveying devices can basically be formed with the same structure. Thus, it can be expected that an installation cost can be substantially reduced.

In addition, since coated films of resin parts without projected parts such as CD-ROM used for electric appliances or the like or coated films of flat plate-like resin parts each having a protruded part preliminarily eliminated therefrom are peeled, a protruded part shearing step B in a preliminary treatment step A and a projected part shearing device usable for practicing the projected part shearing step B can be eliminated to thereby simplify the coated film peeling device 10. Description has been made with respect to peeling of coated films on the bumper of a vehicle and the CD-ROM, however the coated film peeling apparatus can be applied to peeling of coated films on other coated resin products.

While the presently preferred embodiments of the present invention have been shown and described, it is to be understood that these disclosures are for the purpose of illustration and that various changes and modifications may be made without departure from the scope of the invention as set forth in the appended claims.

What is claimed is:

1. A system for recycling of a resin product coated with a film, comprising:

shearing means for removing a protruding portion from said resin product by crushing said resin product between a first pair of rollers and for making a plurality of resin product strips;

first transferring means for receiving said resin product strips and for flatting thereof including a first plurality of pairs of rollers rotated at first different speeds with respect to each other in order to flatten said resin product strip;

edge forming means for making a trapezoid cross-sectional shape of said resin product strip including a second pair of rollers for producing a trapezoidal shaped resin product;

second transferring means for receiving said trapezoidal shaped resin product strip including a second plurality of pairs of rollers; and film removing means for separating said film from said trapezoidal shaped resin product strip by giving a sheer stress therebetween including a third pair of rollers rotated at second different speeds with respect to each other.

2. The system for recycling according to claim 1, said film removing means further comprising:

upper surface film removing means for separating said film on an upper surface of said trapezoidal shaped resin product strip by giving said sheer stress therebetween through said third pair of rollers rotated at said second different speeds with respect to each other; and lower surface film removing means for separating said film on a lower surface of said trapezoidal shaped resin product strip by giving said sheer stress therebetween through a fourth pair of rollers rotated at said second different speeds with respect to each other.

3. The system for recycling according to claim 2, further comprising:

third transferring means interposed between said upper surface film removing means and said lower surface film removing means for transferring said trapezoidal shaped resin product strip including a third plurality of pairs of rollers.

4. The system for recycling according to claim 3, wherein:

said pairs of rollers of said third transferring means rotate at different speeds with respect to each other.

5. The system of recycling according to claim 2 further comprising delivery means provided in said lower surface film removing means for conveying removed film.

6. The system for recycling according to claim 1, further comprising:

driving means provided on said first, second and third transferring means for simultaneously rotating said first, second and third plurality of pairs of rollers.

7. The system for recycling according to claim 1, further comprising:

a scraper for said film arranged in the vicinity of a rolling surface of one roller of said third pair of rollers and in the vicinity of a rolling surface of one roller of said fourth pair of rollers, said scraper having a predetermined clearance for removing said film adhered to said roller.

8. The system of recycling according to claim 1, further comprising:

delivery means provided in said film removing means for conveying removed film.

9. A recycling method of a resin product coated with a film, comprising the steps of:

removing a protruding portion from said resin product by crushing thereof between a first pair of rollers;

flattening said resin product by moving said resin product through a first plurality of pairs of rollers rotated at first different speeds with respect to each other in order to flatten said resin product;

making a trapezoidal cross-sectional shape of said resin product by passing said resin product through a second pair of rollers;

transferring said resin product to a next step by moving said resin product through second plurality of pairs of rollers; and separating a film from said resin product by giving a sheer stress therebetween through a third pair of rollers rotated at second different speeds with respect to each other.

* * * * *